(12) United States Patent
Miyazawa et al.

(10) Patent No.: US 9,354,831 B2
(45) Date of Patent: May 31, 2016

(54) MEDIATION SERVER AND IMAGE PROCESSING APPARATUS CAPABLE OF MEDIATING NETWORK COMMUNICATION FOR ACCESSING A SERVICE PROVISION SERVER

(71) Applicant: BROTHER KOGYO KABUSHIKI KAISHA, Nagoya-shi, Aichi-ken (JP)

(72) Inventors: Masafumi Miyazawa, Nagoya (JP); Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/579,266

(22) Filed: Dec. 22, 2014

(65) Prior Publication Data
US 2015/0186087 A1   Jul. 2, 2015

(30) Foreign Application Priority Data
Dec. 26, 2013  (JP) ................................. 2013-269176

(51) Int. Cl.
*G06F 3/12* (2006.01)
*H04N 1/00* (2006.01)

(52) U.S. Cl.
CPC ............ *G06F 3/1253* (2013.01); *G06F 3/1205* (2013.01); *G06F 3/1288* (2013.01); *H04N 1/00127* (2013.01)

(58) Field of Classification Search
CPC ... G06F 3/1203; G06F 3/1204; G06F 3/1206; G06F 3/1253; G06F 3/1255; G06F 3/1288; G06F 3/129; G06F 3/1224; G06F 3/1285
USPC .............................................. 358/1.13, 1.15
See application file for complete search history.

(56) References Cited

U.S. PATENT DOCUMENTS

| | | | |
|---|---|---|---|
| 2011/0242558 A1* | 10/2011 | Usui ............................ | 358/1.13 |
| 2012/0113464 A1 | 5/2012 | Inoue et al. | |
| 2012/0113469 A1* | 5/2012 | Urakawa ...................... | 358/1.15 |
| 2012/0218599 A1* | 8/2012 | Kashioka ...................... | 358/1.15 |
| 2012/0307293 A1* | 12/2012 | Natori .......................... | 358/1.15 |
| 2013/0083353 A1* | 4/2013 | Nishikawa et al. .......... | 358/1.15 |
| 2013/0135668 A1* | 5/2013 | Minagawa ................... | 358/1.15 |
| 2013/0148155 A1* | 6/2013 | Kitagata ....................... | 358/1.15 |
| 2013/0215469 A1* | 8/2013 | Pizot et al. ................... | 358/1.15 |

FOREIGN PATENT DOCUMENTS

| | | |
|---|---|---|
| JP | H1179537 A | 3/1999 |
| JP | 2012099011 A | 5/2012 |

* cited by examiner

*Primary Examiner* — Benny Q Tieu
*Assistant Examiner* — Juan M Guillermety
(74) *Attorney, Agent, or Firm* — Scully, Scott, Murphy & Presser, PC

(57) ABSTRACT

A mediation server for mediating target service provision from a service provision server to an image processing apparatus, including a processor causing the mediation server to supply specific information for displaying a condition setting screen to an external apparatus, receive a plurality of selected setting values from the external apparatus, supply, to the image processing apparatus, a determination execution instruction including the plurality of selected setting values and for executing a determination about validity of a combination of the plurality of selected setting values, receive a result of the determination from the image processing apparatus, and when the result indicates that the combination is valid, supply, to the image processing apparatus, a processing execution instruction including the plurality of selected setting values and being for executing the target image processing in accordance with the determined processing condition.

11 Claims, 9 Drawing Sheets

FIG. 5
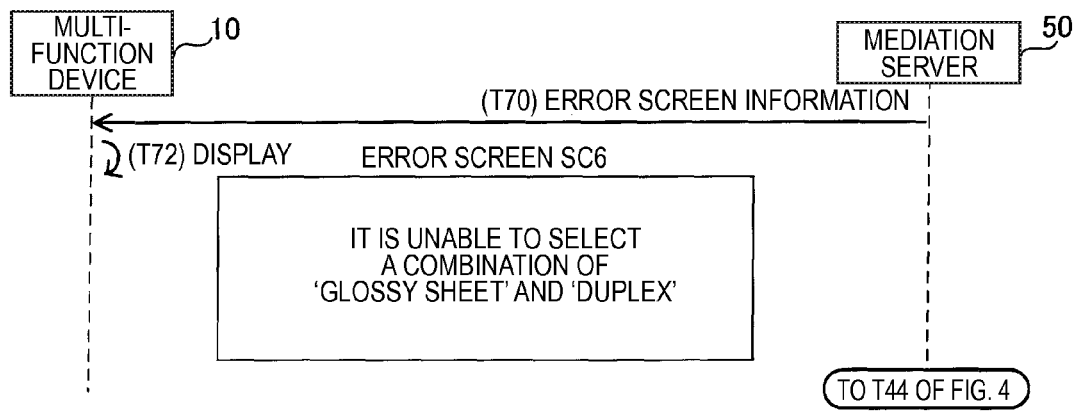
(CASE A1: DETERMINATION RESULT = NG) EX. ITEM 'SHEET' = GLOSSY SHEET & ITEM 'DUPLEX' = DUPLEX
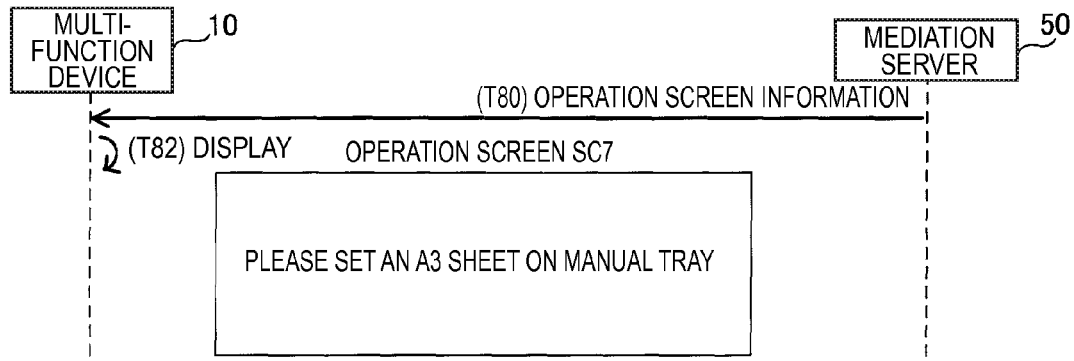
(CASE A2: DETERMINATION RESULT = OK WITH OPERATION REQUIRED) EX. ITEM 'SHEET'=A3
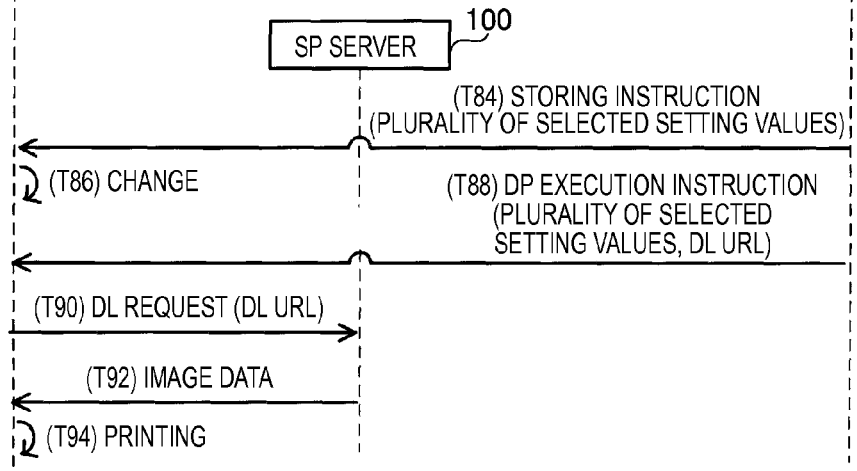
(CASE A3: DETERMINATION RESULT = OK)

FIG. 8
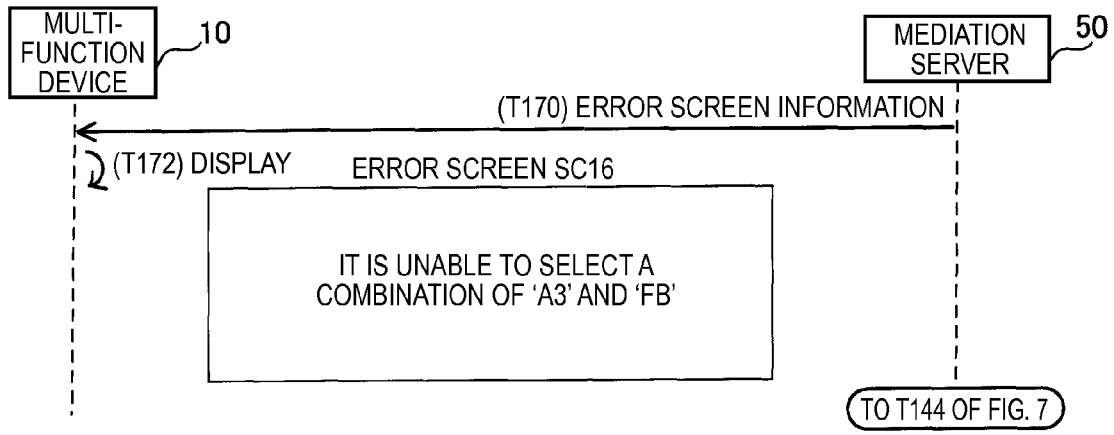
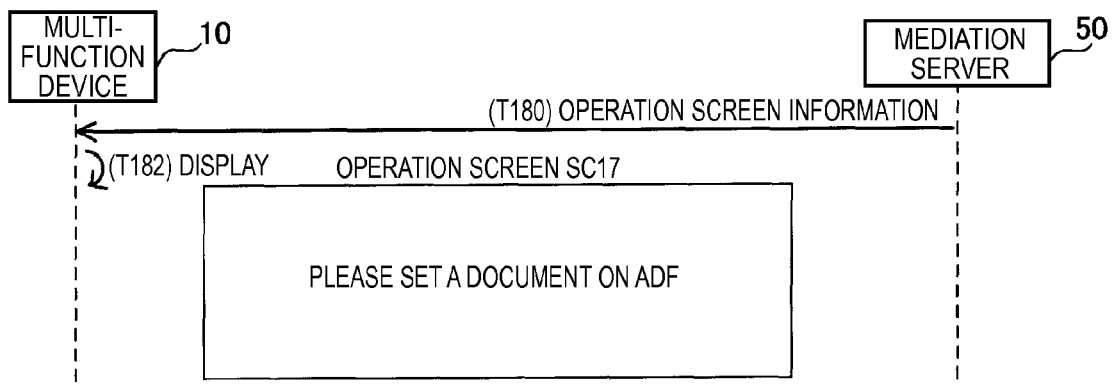
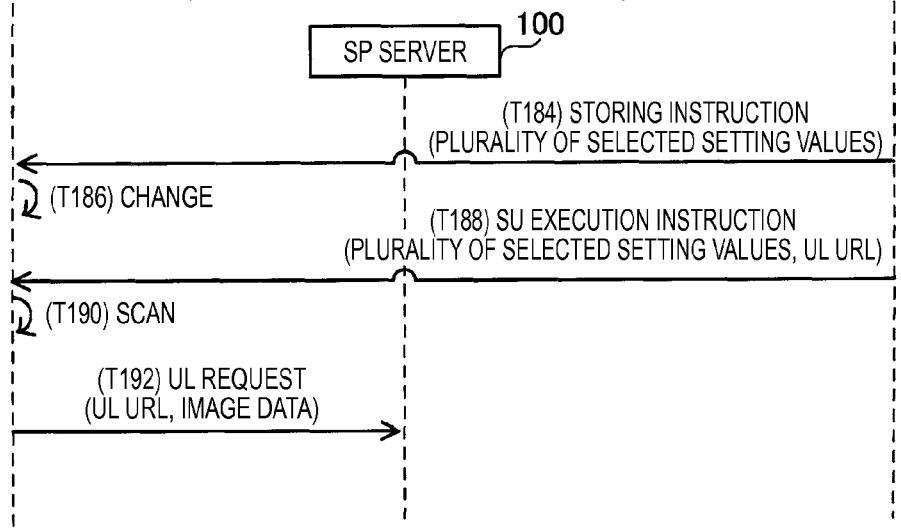

MEDIATION SERVER AND IMAGE PROCESSING APPARATUS CAPABLE OF MEDIATING NETWORK COMMUNICATION FOR ACCESSING A SERVICE PROVISION SERVER

CROSS-REFERENCE TO RELATED APPLICATIONS

This application claims priority from Japanese Patent Application No. 2013-269176 filed on Dec. 26, 2013, the entire subject-matter of which is incorporated herein by reference.

TECHNICAL FIELD

The disclosure relates to a mediation server configured to mediate target service provision from a service provision server to an image processing apparatus, and the image processing apparatus.

BACKGROUND

There has been disclosed a service cooperation system including a multi-function device and a relay apparatus. When one service is selected from a plurality of types of services by a user, the multi-function device performs a variety of communications with the relay apparatus for receiving the selected service from a service provision apparatus. For example, the multi-function device is configured to sequentially receive an album possessor input user interface (hereinafter, "user interface" will be abbreviated as "UI") display command and an album name selection UI display command. Thereby, the multi-function device sequentially displays an album possessor input UI and an album name selection UI. Then, the user can execute a variety of settings (for example, an input of an album possessor name, a selection of an album name, and the like) relating to the selected service on each UI.

SUMMARY

The above-described related art does not consider that a processing condition of image processing (for example, image processing for print, image processing for scan, and the like) to be executed by the multi-function device is set by the user.

The disclosure assumes a situation where a processing condition of image processing is set by a user. Illustrative aspects of the present invention provide a technology capable of reducing a load for establishing a mediation server that is to be used in the situation.

According to one illustrative aspect of the present invention, there may be provided a mediation server for mediating target service provision from a service provision server to an image processing apparatus, the mediation server comprising: a processor; and memory storing instructions, the instructions, when executed by the processor, causing the mediation server to perform: supplying specific information for displaying a condition setting screen to an external apparatus, the condition setting screen being a screen for setting a processing condition of target image processing, the target image processing relating to the target service and being to be executed by the image processing apparatus; in response to a plurality of setting values corresponding to a plurality of setting items being selected on the condition setting screen, receiving the plurality of selected setting values from the external apparatus; supplying a determination execution instruction to the image processing apparatus, the determination execution instruction comprising the plurality of selected setting values and being an instruction for enabling the image processing apparatus to execute a determination about validity of a combination of the plurality of selected setting values; receiving result information indicating a result of the determination from the image processing apparatus; in a case where the result information indicates that the combination is valid, supplying a processing execution instruction to the image processing apparatus, the processing execution instruction comprising the plurality of selected setting values and being an instruction for enabling the image processing apparatus to execute the target image processing in accordance with the processing condition determined by the plurality of selected setting values; and in a case where the result information indicates that the combination is not valid, not to supply the processing execution instruction to the image processing apparatus.

According thereto, the mediation server is configured to enable the image processing apparatus to execute the determination about the validity of the plurality of selected setting values. For this reason, since it is not necessary to provide the mediation server with a plurality of determination programs corresponding to a plurality of types of models, a load for establishing the mediation server is low.

According to another illustrative aspect of the present invention, there may be provided an image processing apparatus comprising: a display unit; and a control device configured to: receive specific information for displaying a condition setting screen on the display unit from a mediation server, the mediation server being configured to mediation target service provision from a service provision server to the image processing apparatus, the condition setting screen being a screen for setting a processing condition of target image processing, the target image processing relating to the target service and being to be executed by the image processing apparatus; display the condition setting screen on the display unit by using the specific information; in response to a plurality of setting values corresponding to a plurality of setting items being selected on the condition setting screen, supply the plurality of selected setting values to the mediation server; receive a determination execution instruction from the mediation server, the determination execution instruction comprising the plurality of selected setting values; in response to receiving the determination execution instruction, determine whether it is possible to execute the target image processing in accordance with the processing condition determined by the plurality of selected setting values included in the determination execution instruction, the determination comprising a determination about validity of a combination of the plurality of selected setting values; supply result information indicating a result of the determination to the mediation server; in a case where the result information indicates that the combination is valid, receive a processing execution instruction from the mediation server, the processing execution instruction comprising the plurality of selected setting values; in a case where the result information indicates that the combination is not valid, not to receive the processing execution instruction from the mediation server; and in response to receiving the processing execution instruction, execute the target image processing in accordance with the processing condition determined by the plurality of selected setting values included in the determination execution instruction.

According thereto, when the image processing apparatus receives the determination execution instruction from the mediation server, the image processing apparatus executes the determination about the validity of the plurality of selected setting values and supplies the result information to the mediation server. For this reason, since it is not necessary to provide the mediation server with a plurality of determination programs corresponding to a plurality of types of models, a load for establishing the mediation server is low.

A control method, a computer program and a computer-readable storage medium having the computer program recorded therein for implementing the mediation server are also novel and useful. Also, a control method, a computer program and a computer-readable storage medium having the computer program recorded therein for implementing the image processing apparatus are also novel and useful. Also, a system including the mediation server and the image processing apparatus is also novel and useful.

BRIEF DESCRIPTION OF THE DRAWINGS

FIG. 5 shows a sequence diagram following FIG. 4;

FIG. 8 shows a sequence diagram following FIG. 7; and

DETAILED DESCRIPTION

First Illustrative Embodiment

Configuration of System

Figure 1:
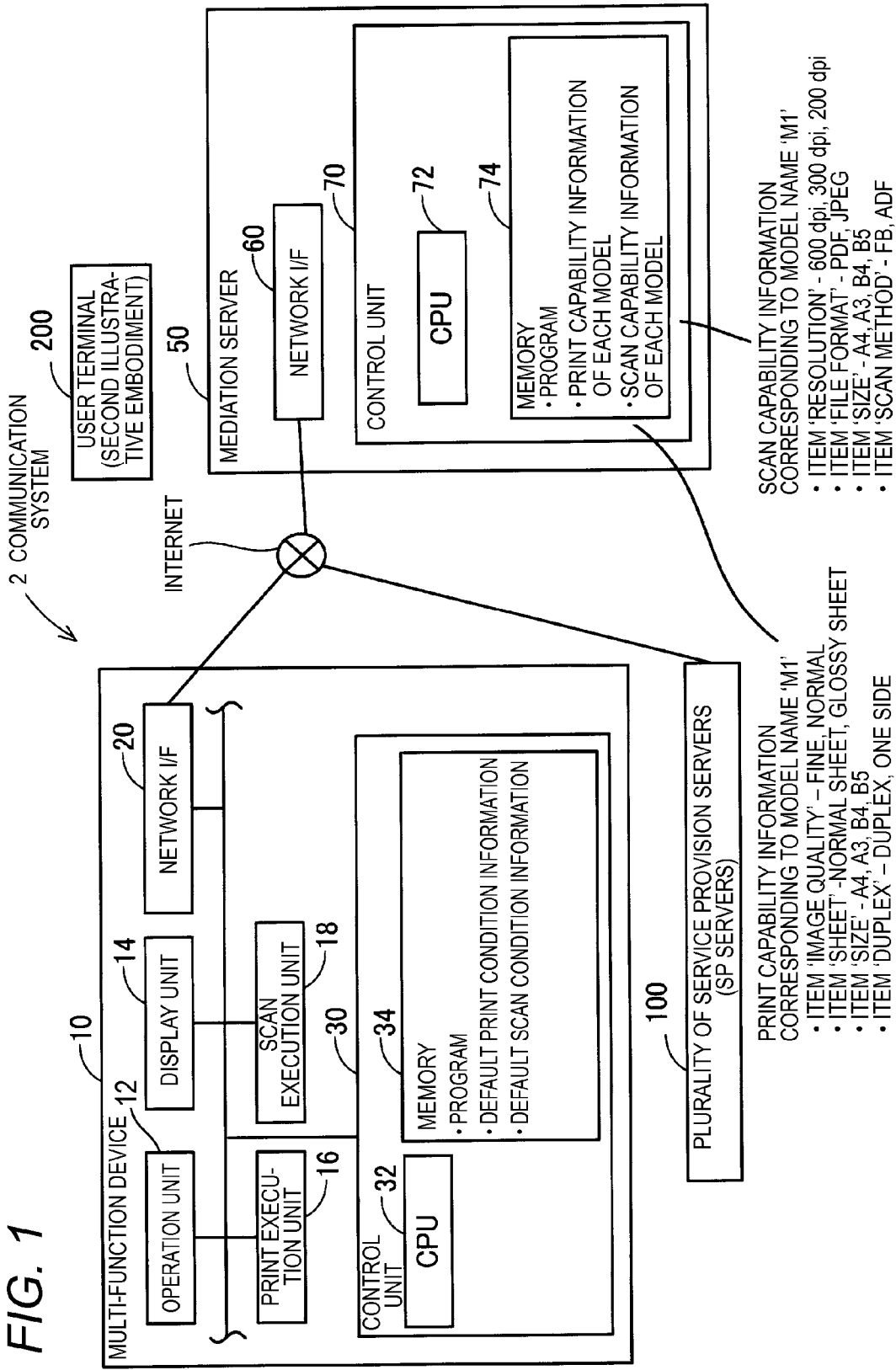
FIG. 1 illustrates a configuration of a communication system.

As shown in FIG. 1, a communication system 2 includes a multi-function device 10, a mediation server 50 and a plurality of service provision servers (hereinafter, referred to as 'SP server') 100. The devices 10, 50, 100 are separately configured.

(Configuration of Multi-Function Device 10)

The multi-function device 10 can execute a plurality of functions including print, scan, copy and FAX functions. The multi-function device 10 is a device connected to a LAN (Local Area Network) (not shown), and is a peripheral device of other apparatus (for example, PC (Personal Computer)) connected to the LAN. The multi-function device 10 has an operation unit 12, a display unit 14, a print execution unit 16, a scan execution unit 18, a network I/F 20 and a control unit 30.

The operation unit 12 has a plurality of keys. A user can input a variety of instructions to the multi-function device 10 by operating the operation unit 12. The display unit 14 is a display for displaying a variety of information. The display unit 14 functions as a so-called touch panel. That is, the display unit 14 also functions as an operation unit configured to be operated by the user. The print execution unit 16 has a print mechanism such as an inkjet type, a laser type and the like. The scan execution unit 18 has a scan mechanism such as a CCD, a CIS and the like. The network I/F 20 is an interface for connection to the LAN (not shown). The multi-function device 10 can be connected to the Internet through the network I/F 20 (i.e., through the LAN).

The control unit 30 has a CPU 32 and a memory 34. The CPU 32 is configured to execute a variety of processing, in response to a program stored in the memory 34. The memory 34 is configured to store therein default print condition information and default scan condition information, in addition to the program. The default print condition information is information indicating a plurality of (four, in this illustrative embodiment) default setting values to be first displayed on a print condition screen (refer to SC5 of FIG. 4, which will be described later). The default scan condition information is information indicating a plurality of (four, in this illustrative embodiment) default setting values to be first displayed on a scan condition screen (refer to SC15 of FIG. 7, which will be described later).

(Configuration of Mediation Server 50)

The mediation server 50 is a server provided by a vendor of the multi-function device 10. The mediation server 50 is a server for mediating service provision to the multi-function device 10 from the respective SP servers 100.

The mediation server 50 has a network I/F 60 and a control unit 70. The mediation server 50 can be connected to the Internet through the network I/F 60. The control unit 70 has a CPU 72 and a memory 74. The CPU 72 is configured to execute a variety of processing, in response to a program stored in the memory 74.

The program in the memory 74 includes a plurality of APIs (Application Program Interfaces) corresponding to the plurality of SP servers 100. Each of the plurality of APIs is a program for performing communication with the SP server corresponding to the API, thereby executing data processing. The memory 74 is configured to store therein, for each model of the multi-function device, print capability information corresponding to the model and scan capability information corresponding to the model, in addition to the program. The capability information is beforehand registered in the memory 74 by a manager (i.e., the vendor of the multi-function device 10) of the mediation server 50.

In this illustrative embodiment, a model name of the multi-function device 10 is 'M1'. The print capability information corresponding to the model name 'M1' indicates each value that can be used when the multi-function device 10 executes a print function. The print capability information includes two values (i.e., 'fine' and 'normal') corresponding to an item 'image quality', two values (i.e., 'normal sheet' and 'glossy sheet') corresponding to an item 'sheet', four values (i.e., 'A4', 'A3' and the like) corresponding to an item 'size' and two values (i.e., 'duplex' and 'one side') corresponding to an item 'duplex'. The item 'image quality' is an item indicating a quality of an image to be printed. The item 'sheet' is an item indicating a type of a printing medium. The item 'size' is an item indicating a size of the printing medium. The item 'duplex' is an item indicating whether an image is printed on both sides of the printing medium or only on one side of the printing medium.

Also, the scan capability information corresponding to the model name 'M1' indicates each value that can be used when the multi-function device 10 executes the scan function. The scan capability information includes three values (i.e., '600 dpi', '300 dpi' and the like) corresponding to an item 'resolution', two values (i.e., 'PDF' and 'JPEG') corresponding to an item 'file format', four values (i.e., 'A4', 'A3' and the like) corresponding to an item 'size' and two values (i.e., 'FB' and 'ADF') corresponding to an item 'scan method'. The item 'resolution' is an item indicating a resolution for document scan. The item 'file format' is an item indicating an image data file format generated from scan data. The item 'size' is an item indicating a document size of a scan target. The item 'scan method' is an item indicating whether a flat bed scan (i.e., FB scan) or an auto document feeder (ADF) scan is executed. The FB scan is a method of moving an optical element (CCD, CIS and the like) to scan a document at a state where the document is stationary on a transparent plate. The ADF scan is a method of moving a document by an ADF to scan the document at a state where an optical element is stationary.

(Configuration of SP Server 100)

The SP server 100 are servers (i.e., cloud servers) having respective service names such as 'Evernote (registered trademark)', 'Google (registered trademark) Docs', 'PICASA (registered trademark)', 'Facebook (registered trademark)' and the like. Each SP server 100 is configured to provide a service corresponding to the SP server to a communication apparatus (for example, the multi-function device 10) through the Internet. Each SP server 100 can provide a variety of services to the communication apparatus by executing various functions. In this illustrative embodiment, each SP server 100 can execute a function (hereinafter, referred to as 'image data preservation function') of receiving image data from the communication apparatus and preserving the image data. Also, each SP server 100 can execute a function (hereinafter, referred to as 'image data supply function') of supplying the image data preserved therein to the communication apparatus.

Figure 2:
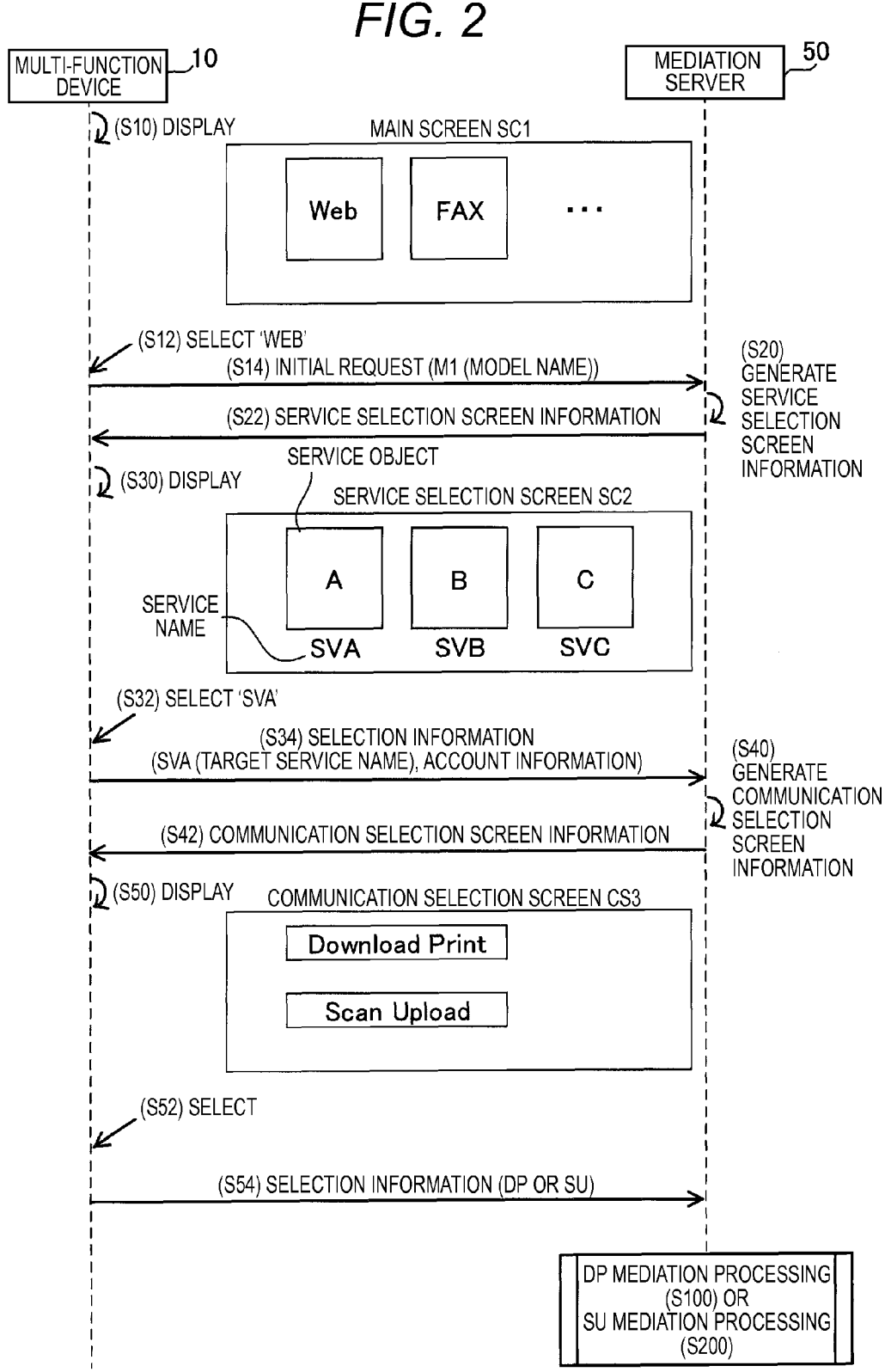
FIG. 2 shows a sequence diagram of respective processing that is executed by a multi-function device and a mediation server.

(Respective Processing to be Executed by Multi-Function Device 10 and Mediation Server 50; FIG. 2)

In this illustrative embodiment, it is assumed that the multi-function device 10 receives a service from the service provision server 100 and executes a download print or scan upload. The download print is a method of downloading image data from the service provision server 100 and printing an image expressed by the image data. In this case, the service provision server 100 is configured to execute the image data supply function. Also, the scan upload is a method of scanning a document to generate image data and uploading the image data to the service provision server 100. In this case, the service provision server 100 is configured to execute the image data preservation function. In the below, the download print and the scan upload may be also referred to as 'DP (Download Print)' and 'SU (Scan Upload)'.

As shown in FIG. 2, in S10, the CPU 32 of the multi-function device 10 supplies data for display beforehand stored in the memory 34 to the display unit 14 and displays a main screen SC1 on the display unit 14. The main screen SC1 includes an object indicating 'Web' and an object indicating 'FAX'. The object indicating 'Web' is an object indicating execution of connection to the Internet. The object indicating 'FAX' is an object indicating execution of a FAX function. Incidentally, the main screen SC1 may further include other objects (for example, an object indicating 'Copy') indicating execution of other functions.

In S12, the user selects the object indicating 'Web' on the main screen SC1. Incidentally, the user may execute the selection in S12 by operating the operation unit 12 or by using the touch panel of the display unit 14. Also in following steps, the user may perform an operation by using any of the operation unit 12 and the touch panel of the display unit 14.

In S14, the CPU 32 of the multi-function device 10 supplies an initial request to the mediation server 50. The initial request is a command for requesting screen information relating to connection to the Internet. The initial request includes the model name 'M1' of the multi-function device 10.

When the CPU 72 of the mediation server 50 receives the initial request from the multi-function device 10, the CPU 72 generates service selection screen information for displaying a service selection screen (refer to SC2, which will be described later) on the multi-function device 10, in S20. The service selection screen is a screen for selecting one service from the plurality of services corresponding to the plurality of SP servers 100. Then, in S22, the CPU 72 supplies the service selection screen information to the multi-function device 10.

When the CPU 32 of the multi-function device 10 receives the service selection screen information from the mediation server 50, the CPU 32 displays a service selection screen SC2 on the display unit 14 by using the service selection screen information, in S30. For example, the service selection screen information may include an ID for identifying screen layout data beforehand stored in the memory 34 of the multi-function device 10 and each information relating to each service. In this case, in S30, the CPU 32 receives screen layout data identified by the ID from the memory 34 and generates data for display by using the screen layout data and each information relating to each service. Then, the CPU 32 supplies the data for display to the display unit 14 to display the service selection screen SC2 on the display unit 14. Also, for example, the service selection screen information may include the data for display to be supplied to the display unit 14. In this case, the CPU 32 supplies the data for display included in the service selection screen information to the display unit 14 to display the service selection screen SC2 on the display unit 14. The above-described method may be used for any of screens (for example, SC3 to SC7 and SC14 to SC17), which will be described later.

The service selection screen SC2 includes a plurality of service object corresponding to the plurality of services and a plurality of service names corresponding to the plurality of services. In S32, the user selects a service having a service name 'SVA' on the service selection screen SC. Meanwhile, in the below, the service name (i.e., 'SVA') selected in S32, a service having the service name and the SP server configured to provide the service are respectively referred to as 'target service name', 'target service' and 'target SP server'. In S34, the CPU 32 of the multi-function device 10 supplies selection information including the target service name 'SVA' and account information to the mediation server 50. The account information is information (for example, a user name, a password and the like) for receiving a service from the target SP server, and is beforehand registered in the multi-function device 10 by the user.

When the CPU 72 of the mediation server 50 receives the selection information from the multi-function device 10, the CPU 72 generates communication selection screen information for displaying a communication selection screen (refer to SC3, which will be described later) on the multi-function device 10, in S40. The communication selection screen is a screen for selecting whether the multi-function device 10 is enabled to execute the download print (i.e., DL) or scan upload (i.e., SU). Then, in S42, the CPU 72 supplies the communication selection screen information to the multi-function device 10.

When the CPU 32 of the multi-function device 10 receives the communication selection screen information from the mediation server 50, the CPU 32 displays a communication selection screen SC3 on the display unit 14 by using the communication selection screen information, in S50. The communication selection screen SC3 includes a character string 'Download Print' and a character string 'Scan Upload'. The communication selection screen SC3 can be referred to as a screen for selecting any one of download communication of image data and upload communication of image data. In S52, the user selects DP or SU on the communication selection screen SC3. In this case, in S54, the CPU 32 of the multi-function device 10 supplies selection information indicating the DP or SU selected by the user to the mediation server 50.

When the CPU 72 of the mediation server 50 receives the selection information from the multi-function device 10, the CPU 72 executes DP mediation processing of S100 (refer to FIG. 3) if the selection information indicates DP, and executes SU mediation processing of S200 (refer to FIG. 6) if the selection information indicates SU.

Figure 3:
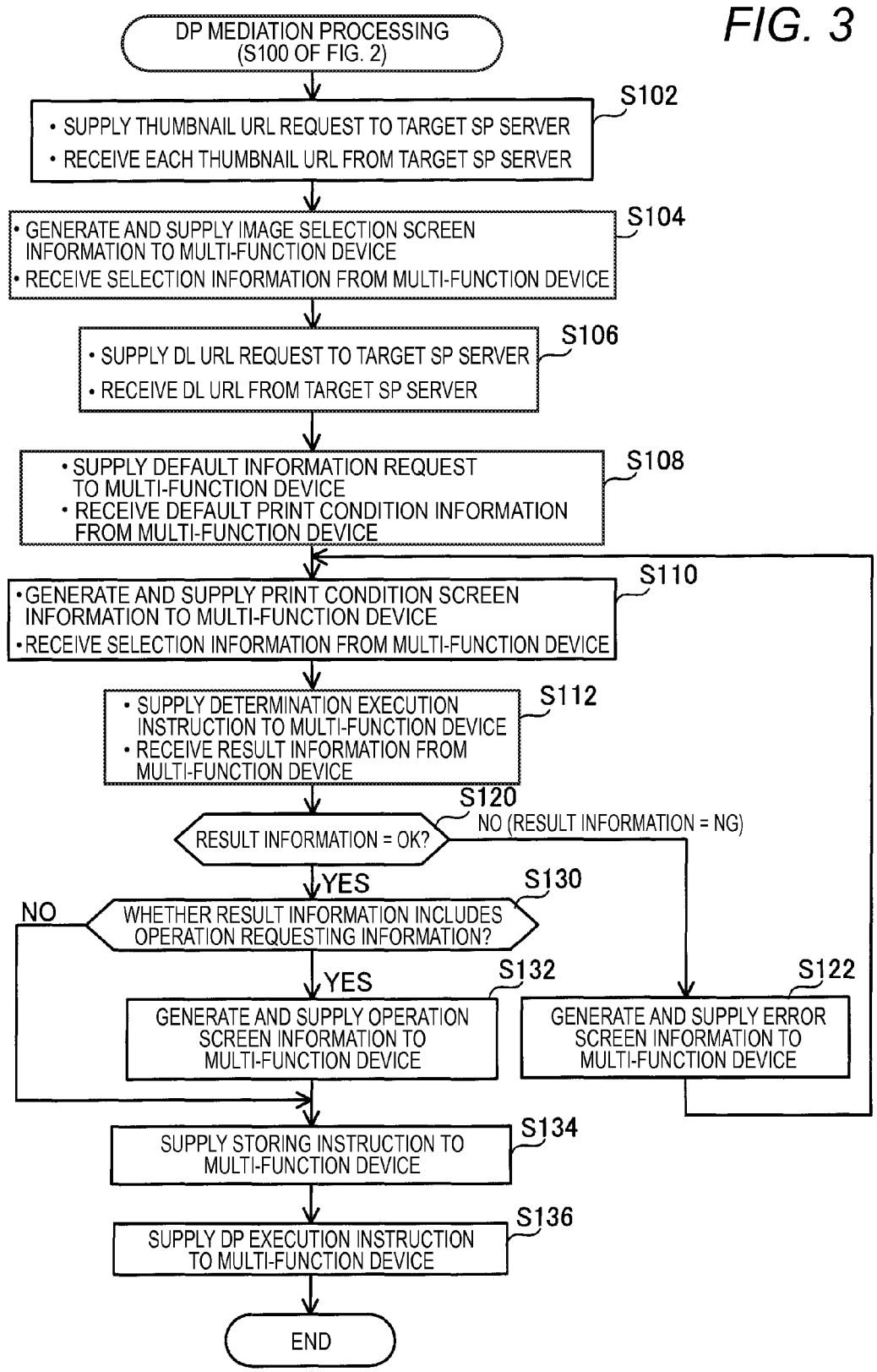
FIG. 3 shows a flowchart of DP mediation processing that is executed by the mediation server.

(DP Mediation Processing; FIG. 3)

Subsequently, the DP mediation processing is described with reference to FIG. 3. In S102, the CPU 72 of the mediation server 50 supplies a thumbnail URL request to the target SP server and receives each thumbnail URL from the target SP server.

The thumbnail URL request includes the account information in the selection information in S34 of FIG. 2. When the target SP server 100 receives the thumbnail URL request from the mediation server 50, the target SP server 100 executes authentication by using the account information. Also in the below, when the mediation server 50 or multi-function device 10 supplies a request (for example, S106 of FIG. 3, T20 of FIG. 4 and the like) to the target SP server 100, the account information is included in the request and the authentication is executed by the target SP server 100. However, in the below, the description of the authentication is omitted. When the authentication is successful, the target SP server 100 supplies each thumbnail URL indicating a position of each thumbnail image data to the mediation server 50. The thumbnail image data is reduced data of the image data preserved with being associated with the account information in the target SP server 100.

In S104, the CPU 72 generates image selection screen information for displaying an image selection screen (refer to SC4 of FIG. 4, which will be described later) on the multi-function device 10 and supplies the same to the multi-function device 10. The image selection screen information includes each thumbnail URL obtained in S102. The image selection screen is a screen for selecting one thumbnail image from one or more thumbnail images. In S104, the CPU 72 further receives selection information from the multi-function device 10. The selection information includes an image ID for identifying original image data of the selected thumbnail image.

In S106, the CPU 72 supplies a DL (Download) URL request including the image ID in the selection information obtained in S104 to the target SP server 100 and receives a DL URL from the target SP server 100. The DL URL is a URL indicating a position of image data identified by the image ID, i.e., a position of image data of a download target.

In S108, the CPU 72 supplies a default information request including information indicating a print to the multi-function device 10 and receives default print condition information (refer to the memory 34 in FIG. 1) from the multi-function device 10.

In S110, the CPU 72 generates print condition screen information for displaying a print condition screen (refer to SC5 of FIG. 4, which will be described later) on the multi-function device 10. The print condition screen is a screen for setting a processing condition of image processing for print that is to be executed by the multi-function device 10 by receiving image data from the target SP server. Specifically, the CPU 72 generates the print condition screen information, as follows.

The CPU 72 first receives the print capability information (refer to FIG. 1) corresponding to the model name 'M1' (refer to the initial request in S14 of FIG. 2) of the multi-function device 10, from the memory 74. Then, the CPU 72 generates the print condition screen information so that the four character strings (i.e., 'image quality', 'sheet', 'size', 'duplex') indicating the four items are included in the print condition screen. Also, the CPU 72 generates the print condition screen information so that the four default setting values in the default print condition information obtained in S108 are first displayed. Thereby, the four default setting values are first displayed on the print condition screen. Therefore, when the user wants the same setting values as the respective setting values selected in previous time, the user can easily select the respective setting values. Also, the CPU 72 generates the print condition screen information so that the plurality of values (for example, two values ('fine' and 'normal') corresponding to the item 'image quality') corresponding to the each of the four items in the print capability information is displayed with being switched as an option. In the below, the plurality of values is referred to as 'the plurality of candidate values'. That is, the CPU 72 generates the print condition screen information including the four character strings indicating the four items, the four default setting values and the plurality of candidate values.

In S110, the CPU 72 further supplies the print condition screen information to the multi-function device 10 and receives the selection information from the multi-function device 10. The selection information includes the plurality of setting values (hereinafter, referred to as the 'plurality of (four, in this illustrative embodiment) selected setting values') selected on the print condition screen by the user.

In S112, the CPU 72 supplies a determination execution instruction including the four selected setting values in the selection information obtained in S110 to the multi-function device 10. The determination execution instruction is an instruction for enabling the multi-function device 10 to determine whether it is possible to execute the image processing for print in accordance with the four selected setting values. The determination includes a determination about validity of a combination of the four selected setting values.

In S112, the CPU 72 further receives result information indicating a result of the determination from the multi-function device 10. The result information includes information indicating 'OK' or information indicating 'NG'. The information indicating 'OK' means that it is determined that the multi-function device 10 can execute the image processing for print in accordance with the four selected setting values. The information indicating 'NG' means that it is determined that the multi-function device 10 is unable to execute the image processing for print in accordance with the four selected setting values. Also, when the result information indicates 'OK', the result information may further include operation requesting information. The operation requesting information is information indicating that the user is requested to perform a predetermined operation relating to the image processing for print.

In S120, the CPU 72 determines whether the result information obtained in S112 includes the information indicating 'OK' or information indicating 'NG'. When the result information includes the information indicating 'NG' (NO in S120), the CPU 72 proceeds to S122. When the result information includes the information indicating 'OK' (YES in S120), the CPU 72 proceeds to S130.

In S122, the CPU 72 supplies error screen information for displaying an error screen (refer to SC6 of FIG. 5, which will be described later) on the multi-function device 10 and supplies the same to the multi-function device 10. The error screen is a screen including a message indicating that a combination of the four selected setting values is not valid, i.e., that the multi-function device 10 is unable to execute the image processing for print in accordance with the four selected setting values.

When the processing of S122 is over, the CPU 72 returns to S110 and again supplies the print condition screen information to the multi-function device 10. Thereby, after the CPU 72 displays the error screen on the multi-function device 10, the CPU 72 can again display the print condition screen on the multi-function device 10. Particularly, as described above, in S110, the CPU 72 generates the print condition screen information so that the four default setting values are first displayed. That is, on the re-displayed print condition screen, the four selected setting values of which combination is determined invalid are not displayed, and the four default setting values are first displayed. Therefore, it is possible to prevent the respective setting values of which combination is determined invalid from being again selected by the user.

In S130, the CPU 72 determines whether the result information obtained in S112 includes the operation requesting information. When it is determined that the result information includes the operation requesting information (YES in S130), the CPU 72 generates operation requesting screen information for displaying an operation requesting screen (refer to SC7 of FIG. 5, which will be described later) on the multi-function device 10 and supplies the same to the multi-function device 10, in S132. The operation requesting screen is a screen including a message indicating that a predetermined operation is requested to be executed. When the processing of S132 is over, the CPU 72 proceeds to S134.

On the other hand, when it is determined that the result information does not include the operation requesting information (No in S130), the CPU 72 skips over S132 and proceeds to S134. In S134, CPU 72 supplies a storing instruction including the four selected setting values in the result information obtained in S112 to the multi-function device 10. The storing instruction is an instruction for enabling the multi-function device 10 to execute processing of storing the four selected setting values, as the default print condition information (refer to FIG. 1) in the memory 34 of the multi-function device 10, instead of the four current default setting values.

Subsequently, in S136, the CPU 72 supplies a DP execution instruction including the four selected setting values and the DL URL obtained in S106 to the multi-function device 10. The DP execution instruction is an instruction for enabling the multi-function device 10 to execute a download of image data specified by the DL URL and the image processing for print in accordance with the four selected setting values. When the processing of S136 is over, the DP mediation processing is over.

Figure 4:
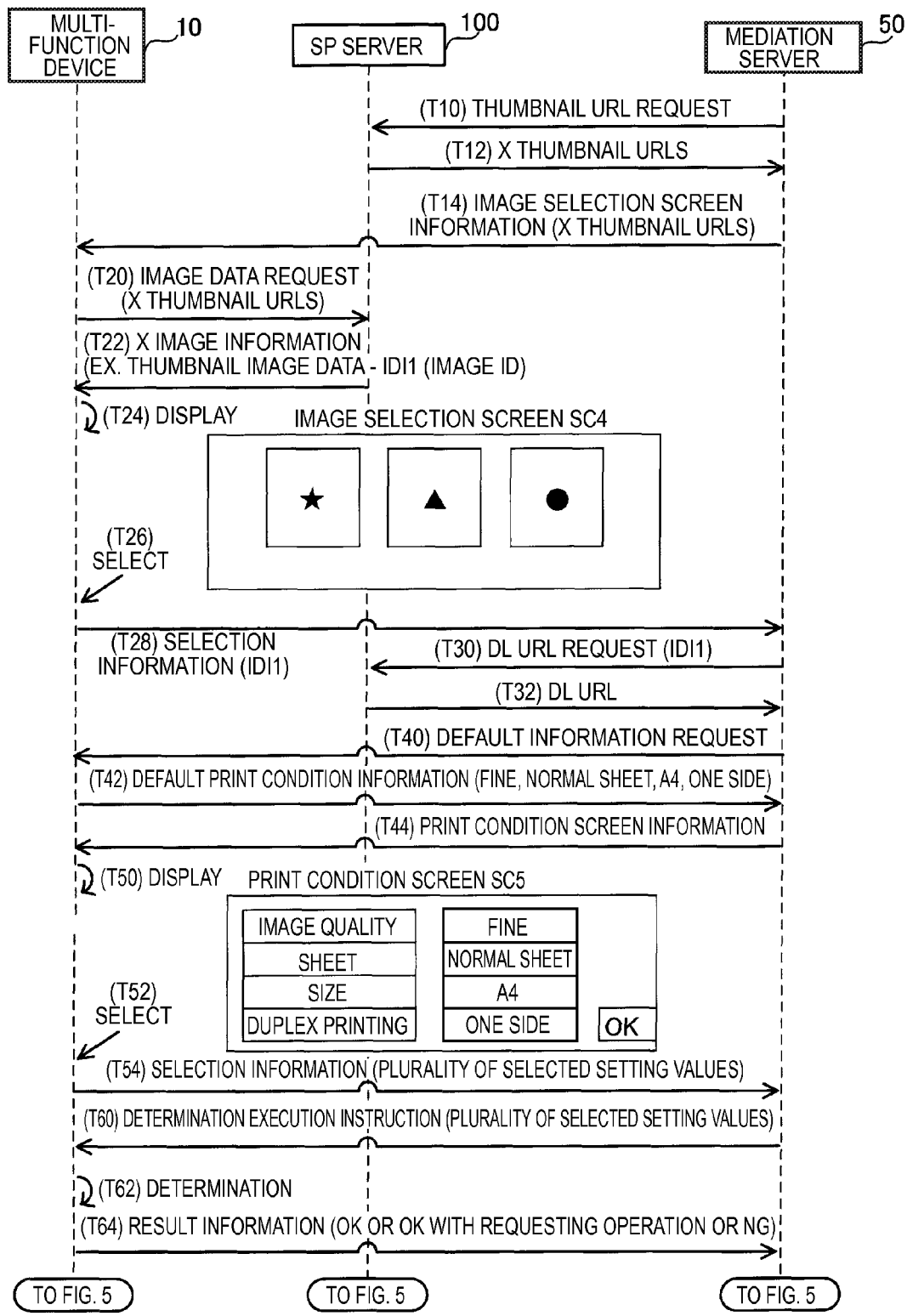
FIG. 4 shows a sequence diagram that is implemented by the DP mediation processing.

(Specific Case; FIGS. 4 and 5)

Subsequently, each case that is implemented by the DP mediation processing of FIG. 3 is described with reference to FIGS. 4 and 5. Incidentally, the respective processing of FIGS. 4 and 5 is executed by the CPU 72 of the mediation server 50 and the CPU 32 of the multi-function device 1. However, in the below, the description of the 'CPU' may be omitted.

In T10 of FIG. 4, the mediation server 50 supplies the thumbnail URL request to the target SP server 100, and receives X thumbnail URLs (X: an integer of 1 or larger) from the target SP server 100 in T12 (refer to S102 of FIG. 3). In T14, the mediation server 50 supplies the image selection screen information including the X thumbnail URLs to the multi-function device 10 (S104).

When the multi-function device 10 receives the image selection screen information from the mediation server 50, the multi-function device 10 supplies the image data request including the X thumbnail URLs to the SP server 100 in T20, and receives X image information from the SP server 100 in T22. Each of the X image information is information in which the thumbnail image data and the image ID (i.e., the identification information for identifying the original image data of the thumbnail image data) are associated with each other. Then, in T24, the multi-function device 10 displays an image selection screen SC4 including the X thumbnail images by using the X thumbnail image data in the X image information.

In T26, the user selects a desired thumbnail image (for example, a figure of a star) on the image selection screen SC4. In this case, in T28, the multi-function device 10 supplies the selection information including an image ID 'IDI1' to the mediation server 50. The image ID 'IDI1' is an image ID, which is associated with the thumbnail image data indicating the thumbnail image selected by the user, of X image IDs included in the X image information of T22.

In T30, the mediation server 50 supplies the DL URL request including the image ID 'IDI1' to the target SP server 100, and receives a DL URL from the target SP server 100 in T32 (S106).

In T40, the mediation server 50 supplies the default information request to the multi-function device 10, and receives the default print condition information ('fine', 'normal sheet' and the like) from the multi-function device 10 in T42 (S108). Then, in T44, the mediation server 50 supplies the print condition screen information to the multi-function device 10 (S110).

When the multi-function device 10 receives the print condition screen information from the mediation server 50, the multi-function device 10 displays a print condition screen SC5 by using the print condition screen information in T50. The print condition screen SC5 includes the four character strings (for example, 'image quality' and the like) indicating the four items and the four default setting values (for example, 'fine' and the like). That is, the print condition screen SC5 indicating the four default setting values is first displayed. Also, the multi-function device 10 can switch the display of each value corresponding to each item, in accordance with an instruction provided from the user, by using the plurality of candidate values in the print condition screen information. In T52, the user selects the four desired values corresponding to the four items on the print condition screen SC5 and then selects an OK button. In this case, in T54, the multi-function device 10 supplies the selection information including the four selected setting values to the mediation server 50.

In T60, the mediation server 50 supplies the determination execution instruction including the four selected setting values to the multi-function device 10 (S112). As described above, in this illustrative embodiment, the mediation server 50 receives the four selected setting values from the multi-function device 10 (T54), and supplies the determination execution instruction including the four selected setting values to the multi-function device 10 (T60).

Incidentally, instead of the above-described configuration, the multi-function device 10 may be configured to automatically perform the determination without executing T54 and T60, after the selection in T52. However, according to this configuration, when supplying the print condition screen information (i.e., a command for instructing a display of a screen) of T44 to the multi-function device 10, the mediation server 50 should also supply a command for instructing the execution of the determination to the multi-function device 10. That is, the plurality of commands is supplied at the same time from the mediation server 50 to the multi-function device 10. In this case, the multi-function device 10 should have a program for receiving the plurality of commands at the same time, so that a program configuration of the multi-function device 10 may be complicated.

In contrast, according to this illustrative embodiment, since the plurality of commands is not supplied at the same time from the mediation server 50 to the multi-function device 10, it is possible to prevent the program configuration of the multi-function device 10 from being complicated.

When the multi-function device 10 receives the determination execution instruction from the mediation server 50, the multi-function device 10 determines whether it is possible to execute the image processing for print in accordance with the four selected setting values, in T62. As described above, in T52, the four selected setting values are selected within the range of the print capability information (refer to FIG. 1) indicating the print conditions that can be executed by the multi-function device 10. Therefore, noticing the respective items, the multi-function device 10 can execute the image processing for print in accordance with the selected setting values corresponding to the items. However, the multi-function device 10 is unable to execute the image processing for print in accordance with a combination of the selected setting value 'glossy sheet' corresponding to the item 'sheet' and the selected setting value 'duplex' corresponding to the item 'duplex'. That is, since the glossy sheet has only one side having a glossy texture, it is not suitable for duplex print. That is, while the multi-function device 10 can execute the image processing for print in accordance with any of a combination of 'glossy sheet' and 'one side', a combination of 'normal sheet' and 'one side' and a combination of 'normal sheet' and 'duplex', the multi-function device 10 is unable to execute the image processing for print in accordance with the combination of 'glossy sheet' and 'duplex'. In T62, when the four selected setting values include the combination of 'glossy sheet' and 'duplex', the multi-function device 10 determines that the image processing for print is unable to be executed, and generates the result information including the information indicating 'NG'. The result information further includes NG reason information indicating that the combination of 'glossy sheet' and 'duplex' is not valid. On the other hand, when the four selected setting values do not include the combination of 'glossy sheet' and 'duplex', the multi-function device 10 determines that the image processing for print can be executed, and generates the result information including the information indicating 'OK'.

In T62, when it is determined that the image processing for print can be executed, the multi-function device 10 further determines whether the selected setting value corresponding to the item 'size' is 'A3'. When the selected setting value corresponding to the item 'size' is 'A3', the multi-function device 10 generates the result information further including the operation requesting information. The multi-function device 10 has a sheet feeding tray configured to accommodate therein a plurality of printing media before the printing. Although the sheet feeding tray can accommodate therein respective printing media of A4 size, B4 size and B5 size, the sheet feeding tray is unable to accommodate therein a printing medium of A3 size. For this reason, when the user wants to execute the printing for the printing medium of A3 size, the user is requested to set a printing medium of A3 size on a so-called manual tray (i.e., a tray capable of setting only some printing media) provided for the multi-function device 10. In order to enable the user to perform the corresponding operation, the result information including the operation requesting information, which indicates an operation of setting a printing medium of A3 size on the manual tray, is generated in T62. In T64, the multi-function device 10 supplies the result information to the mediation server 50.

(Continuation of FIG. 4; FIG. 5)

A case A1 of FIG. 5 shows a case where the result information including the information indicating 'NG' is supplied to the mediation server 50. In this case, in T70, the mediation server 50 supplies the error screen information including a message indicated by the NG reason information in the result information to the multi-function device 10 (S122 of FIG. 3).

When the multi-function device 10 receives the error screen information from the mediation server 50, the multi-function device 10 displays an error screen SC6 by using the error screen information, in T72. The error screen SC6 includes a message indicating that the combination of 'glossy sheet' and 'duplex' is not valid. Thereby, the user can know that the combination is not valid. Although not shown, the error screen SC6 includes an OK button. When the user selects the OK button, the multi-function device 10 supplies a confirmation notification to the mediation server 50. When the mediation server 50 receives the confirmation notification from the multi-function device 10, the mediation server 50 returns to T44 of FIG. 4 (i.e., returns to S110 after S122).

A case A2 shows a case where the result information including the information indicating 'OK' and the operation requesting information is supplied to the mediation server 50. In this case, in T80, the mediation server 50 supplies the operation screen information including a message indicated by the operation requesting information to the multi-function device 10 (S132).

When the multi-function device 10 receives the operation screen information from the mediation server 50, the multi-function device 10 displays an operation screen SC7 by using the operation screen information, in T82. The operation screen SC7 includes a message indicating that a printing medium of A3 size is requested to be set on the manual tray. Thereby, the user can know that the corresponding operation is to be executed. Although not shown, the operation screen SC7 includes an OK button and a cancel button. When the user selects the OK button, the multi-function device 10 supplies an OK notification to the mediation server 50. When the mediation server 50 receives the OK notification from the multi-function device 10, the mediation server 50 executes respective processing of T84 and T88 shown in a case A3, which will be described later. Also, when the user selects the cancel button, the multi-function device 10 supplies a cancel notification to the mediation server 50. When the mediation server 50 receives the cancel notification from the multi-function device 10, the mediation server 50 returns to T44 of FIG. 4.

A case A3 shows a case where the result information, which includes the information indicating 'OK' and does not include the operation requesting information, is supplied to the mediation server 50. In this case, in T84, the mediation server 50 supplies the storing instruction including the plurality of selected setting values to the multi-function device 10 (S134).

When the multi-function device 10 receives the storing instruction from the mediation server 50, the multi-function device 10 stores the four selected setting values in the storing instruction in the memory 34, as the default print condition information, instead of the four current default setting values, in T86. Thereby, when the multi-function device 10 again receives the default information request from the mediation server 50, the multi-function device 10 can supply four new default setting values to the mediation server 50.

Incidentally, although not shown, the mediation server 50 may further supply screen information for displaying a message screen including a message, which indicates that a printing starts, on the multi-function device 10 to the multi-function device 10. In this case, the multi-function device 10 displays a message screen by using the screen information. The screen information may be supplied to the multi-function device 10 together with the storing instruction of T84, for example. Also, the screen information may be supplied to the multi-function device 10 before the storing instruction of T84. In this case, when a predetermined operation is executed by the user at a state where the message screen is displayed, the multi-function device 10 may supply a predetermined notification to the mediation server 50. When the mediation server 50 receives the predetermined notification from the multi-function device 10, the mediation server 50 may supply the storing instruction of T84 to the multi-function device 10.

In T88, the mediation server 50 supplies the DP execution instruction including the plurality of selected setting values and the DL URL to the multi-function device 10 (S136).

When the multi-function device 10 receives the DP execution instruction from the mediation server 50, the multi-function device 10 supplies a DL request including the DL URL in DP execution instruction to the target SP server 100 in T90 and receives (i.e., download) image data from the target SP server 100, in T92. The image data is data that is preserved at the position (i.e., the position in the target SP server 100) specified by the DL URL in the DL request. That is, the image data supply function is executed by the target SP server 100.

Subsequently, in T94, the multi-function device 10 enables the print execution unit 16 to print an image expressed by the obtained image data. Specifically, the CPU 32 of the multi-function device 10 executes the image processing for print in accordance with the four selected setting values in the DP execution instruction of T88. The image processing for print includes generating print data, instructing the print execution unit 16 to convey a printing medium and supplying the print data to the print execution unit 16. Specifically, the CPU 32 executes halftone processing for the obtained image data, which is RGB image data having multiple tones (for example, 256 tones), and generates print data having relatively small tones (for example, ON or OFF of a dot). In particular, when the selected setting value corresponding to the item 'image quality' indicates 'clear', the CPU 32 generates print data having a high resolution, and when the selected setting value indicates 'normal', the CPU 32 generates print data having a low resolution. Also, the CPU 32 generates print data suitable for an aspect ratio indicated by the selected setting value corresponding to the item 'size'. Also, when the selected setting value corresponding to the item 'duplex' indicates 'duplex', the CPU 32 generates print data for duplex printing, and when the selected setting value indicates 'one side', the CPU 32 generates print data for one-side printing. Further, the CPU 32 instructs the print execution unit 16 to convey a printing medium of a type indicated by the selected setting value corresponding to the item 'sheet', and supplies the generated print data to the print execution unit 16. Thereby, the print execution unit 16 executes a printing for the printing medium in accordance with the print data. As a result, the user can receive the printing medium on which the image (for example, the image corresponding to the thumbnail image indicating the figure of a star selected in T26 of FIG. 4) expressed by the image data preserved in the target SP server 100 is printed.

Figure 6:
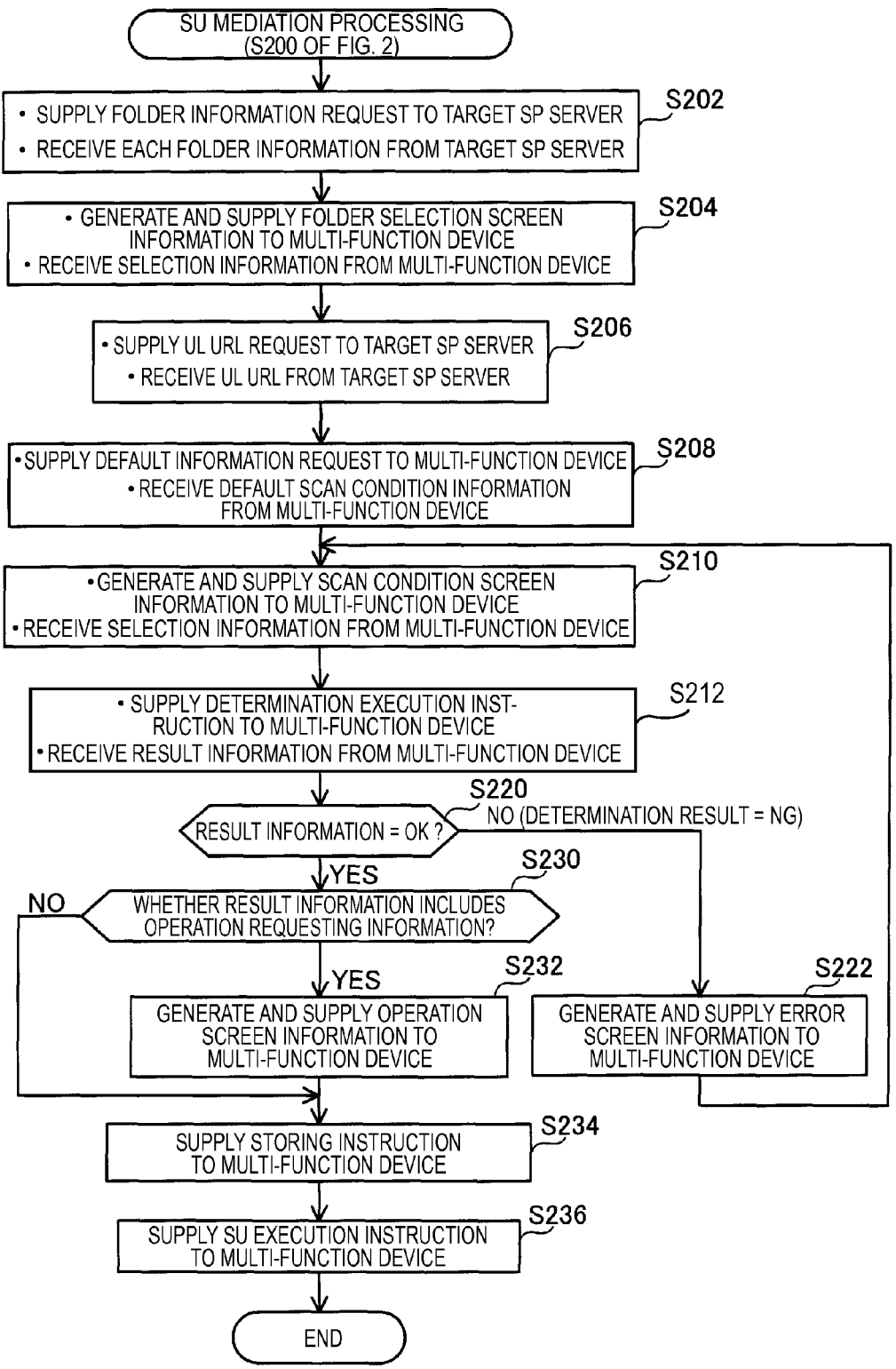
FIG. 6 shows a flowchart of SU mediation processing that is executed by the mediation server.

(SU Mediation Processing; FIG. 6)

Subsequently, the SU mediation processing (refer to S200 of FIG. 2) is described with reference to FIG. 6. Meanwhile, in the below, the same processing as the DP mediation processing of FIG. 3 is briefly described.

In S202, the CPU 72 of the mediation server 50 supplies a folder information request including the account information to the target SP server and receives each folder information from the target SP server. Each folder information is information (i.e., a folder name and a folder ID) about each folder preserved with being associated with the account information in the target SP server 100.

In S204, the CPU 72 generates folder selection screen information for displaying a folder selection screen (refer to SC14 of FIG. 7, which will be described later) on the multi-function device 10 and supplies the same to the multi-function device 10. The folder selection screen information includes each folder information obtained in S202. The folder selection screen is a screen for selecting one folder from one or more folders. In S204, the CPU 72 further receives the selection information from the multi-function device 10. The selection information includes a folder ID for identifying the selected folder.

In S206, the CPU 72 supplies a UL (Upload) URL request including the folder ID in the selection information obtained in S204 to the target SP server 100 and receives a UL URL from the target SP server 100. The UL URL is a URL indicating a position in a folder identified by the folder ID, i.e., a position to which the image data is to be uploaded.

In S208, the CPU 72 supplies a default information request including the information indicating the scan to the multi-function device 10 and receives the default scan condition information (refer to the memory 34 of FIG. 1) from the multi-function device 10.

In S210, the CPU 72 generates scan condition screen information for displaying a scan condition screen (refer to SC15 of FIG. 7, which will be described later) on the multi-function device 10. The scan condition screen is a screen for setting a processing condition of image processing for scan that is executed by the multi-function device 10 so as to generate the image data to be uploaded to the target SP server. Like S110 of FIG. 3, the CPU 72 generates the scan condition screen information by using the scan capability information (refer to FIG. 1) corresponding to the model name 'M1' of the multi-function device 10 and the default scan condition information obtained in S208. In S210, the CPU 72 further supplies the scan condition screen information to the multi-function device 10 and receives the selection information from the multi-function device 10. The selection information includes the four selected setting values.

In S212, the CPU 72 supplies the determination execution instruction including the four selected setting values to the multi-function device 10. The determination execution instruction is an instruction for enabling the multi-function device 10 to determine whether it is possible to execute the image processing for scan in accordance with the four selected setting values. In S212, the CPU 72 further receives result information indicating a result of the determination from the multi-function device 10.

When the result information includes the information indicating 'NG' (NO in S220), the CPU 72 supplies the error screen information to the multi-function device 10 in S222. When the processing of S222 is over, the CPU 72 returns to S210.

When the result information includes the information indicating 'OK' (YES in S220), the CPU 72 proceeds to S230. When the result information includes the operation requesting information (YES in S230), the CPU 72 supplies the operation requesting screen information to the multi-function device 10 in S232. When the result information does not include the operation requesting information (NO in S230), the CPU 72 supplies the storing instruction including the four selected setting values to the multi-function device 10 in S234.

Then, in S236, the CPU 72 supplies an SU execution instruction including the four selected setting values and the UL URL to the multi-function device 10. The SU execution instruction is an instruction for enabling the multi-function device 10 to execute the image processing for scan in accordance with the four selected setting values and the upload of the image data to the position specified by the UL URL. When the processing of S236 is over, the SU mediation processing is over.

Figure 7:
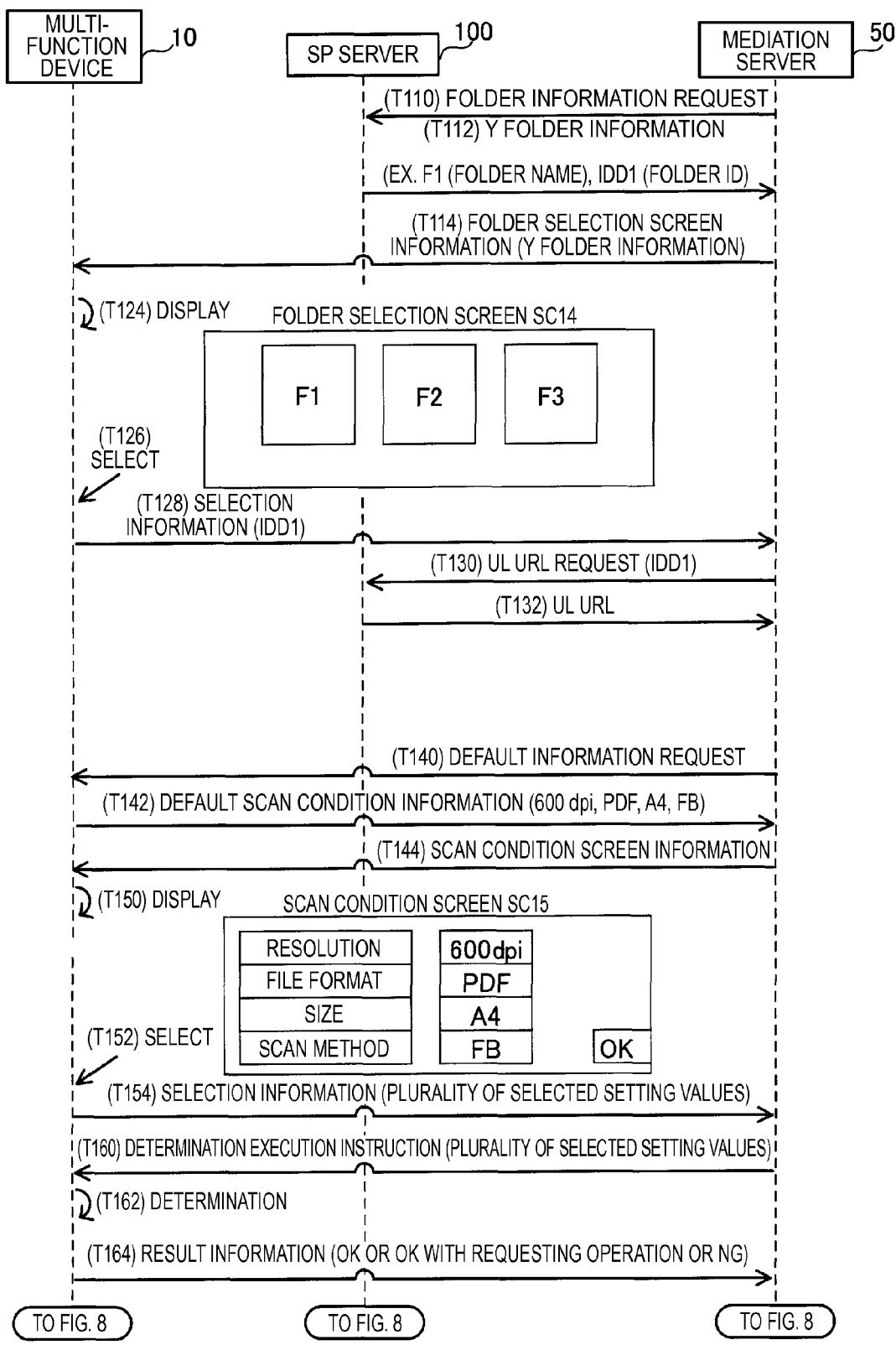
FIG. 7 shows a sequence diagram that is implemented by the SU mediation processing.

(Specific Case; FIGS. 7 and 8)

Subsequently, each case that is implemented by the SU mediation processing of FIG. 6 is described with reference to FIGS. 7 and 8.

In T110 of FIG. 7, the mediation server 50 supplies a folder information request to the target SP server 100, and receives Y (Y: integer of 1 or larger) folder information from the target SP server 100 in T112 (S202 of FIG. 6). In T114, the mediation server 50 supplies the folder selection screen information including the Y folder information to the multi-function device 10 (S204).

When the multi-function device 10 receives the folder selection screen information from the mediation server 50, the multi-function device 10 displays a folder selection screen SC14 including Y folder names 'F1' to 'F2' in the Y folder information in T124. In T126, the user selects a desired folder name (for example, 'F1') on the folder selection screen SC14. In this case, in T128, the multi-function device 10 supplies the selection information including a folder ID 'IDD1' to the mediation server 50. The folder ID 'IDD1' is a folder ID associated with the folder name selected by the user from the Y folder IDs in the Y folder information of T114.

In T130, the mediation server 50 supplies a UL URL request including the folder ID 'IDD1' in the selection information of T128 to the target SP server 100 and receives a UL URL from the target SP server 100 in T132 (S206).

In T140, the mediation server 50 supplies the default information request to the multi-function device 10, and receives the default scan condition information ('600 dpi', 'PDF' and the like) from the multi-function device 10 in T142 (S208). Then, in T144, the mediation server 50 supplies the scan condition screen information to the multi-function device 10 (S210).

When the multi-function device 10 receives the scan condition screen information from the mediation server 50, the multi-function device 10 displays a scan condition screen SC15 by using the scan condition screen information, in T150. In T152, the user selects the four desired values corresponding to the four items on the scan condition screen SC15 and then selects an OK button. In this case, in T154, the multi-function device 10 supplies the selection information including the four selected setting values to the mediation server 50.

In T160, the mediation server 50 supplies the determination execution instruction including the four selected setting values to the multi-function device 10 (S212).

When the multi-function device 10 receives the determination execution instruction from the mediation server 50, the multi-function device 10 determines whether it is possible to execute the image processing for scan in accordance with the four selected setting values in the determination execution instruction, in T162. The multi-function device 10 is unable to execute the image processing for scan in accordance with a combination of the selected setting value 'A3' corresponding to the item 'size' and the selected setting value 'FB' corresponding to the item 'scan method'. This is because that a size of a transparent plate of the multi-function device 10 is smaller than A3. That is, although the multi-function device 10 can execute the image processing for scan in accordance with any of a combination of 'A3' and 'ADF', a combination of a size (for example, A4, B4 or B5), rather than 'A3', and 'ADF' and a combination of a size, rather than 'A3', and 'FB', the multi-function device 10 is unable to execute the image processing for scan in accordance with a combination of 'A3' and 'FB'. The multi-function device 10 performs the determination from the above standpoints and generates the result information.

In T162, when it is determined that the image processing for scan can be execute, the multi-function device 10 further determines whether the selected setting value corresponding to the item 'scan method' is 'ADF'. When it is determined that the selected setting value corresponding to the item 'scan method' is 'ADF', the multi-function device 10 generates the result information further including the operation requesting information, which indicates an operation of setting a document to the ADF. In T164, the multi-function device 10 supplies the result information to the mediation server 50.

(Continuation of FIG. 7; FIG. 8)

A case B1 of FIG. 8 shows a case where the result information including the information indicating 'NG' is supplied to the mediation server 50. In this case, in T170, the mediation server 50 supplies the error screen information to the multi-function device 10 (S222 of FIG. 6). Thereby, in T172, the multi-function device 10 displays an error screen SC16. The error screen SC16 includes a message indicating that the combination of 'A3' and 'FB' is not valid.

A case B2 shows a case where the result information includes the information indicating 'OK' and the operation requesting information is supplied to the mediation server 50. In this case, in T180, the mediation server 50 supplies the operation screen information to the multi-function device 10 (S232). Thereby, in T182, the multi-function device 10 displays an operation screen SC17. The operation screen SC17 includes a message indicating that a document is requested to be set on the ADF.

A case B3 shows a case where the result information, which includes the information indicating 'OK' and does not the operation requesting information, is supplied to the mediation server 50. In this case, in T184, the mediation server 50 supplies the storing instruction to the multi-function device 10 (S234). Thereby, in T186, the multi-function device 10 stores, as the default scan condition information (refer to FIG. 1), the four selected setting values in the storing instruction in the memory 34, instead of the four current default setting values.

In T188, the mediation server 50 supplies the UL execution instruction including the plurality of selected setting values and the UL URL to the multi-function device 10 (S236). Thereby, the multi-function device 10 scans the document in T190 and supplies the UL request including the UL URL and image data to the target SP server 100 in T192. As a result, the image data is uploaded to the position specified by the UL URL (i.e., the position in the target SP server 100). That is, the image data preservation function is executed by the target SP server 100.

In the processing of T190, the CPU 32 of the multi-function device 10 executes the image processing for scan in accordance with the four selected setting values in the SU execution instruction of S188. The image processing for scan includes instructing the scan execution unit 18 to execute the scan and generating the image data from the scan data. Specifically, CPU 32 notifies the scan execution unit 18 of the selected setting value indicated by the item 'resolution', the selected setting value indicated by the item 'size' and the selected setting value indicated by the item 'scan method', thereby instructing the scan execution unit 18 to execute the scan. Thereby, the scan execution unit 18 scans the document in accordance with the respective setting values notified from the CPU 32, thereby generating the scan data, which is the RGB data having multilevel tones (for example, 256 tones). Also, when the selected setting value indicated by the item 'size' indicates 'PDF', the CPU 32 converts the scan data to generate image data of a PDF format, and when the selected setting value indicates 'JPEG', the CPU 32 converts the scan data to generate image data of a JPEG format.

Advantages of First Illustrative Embodiment

According to the first illustrative embodiment, the mediation server 50 supplies the print condition screen information or scan condition screen information to the multi-function device 10 (T44 of FIG. 4, T144 of FIG. 7) to display the print condition screen SC5 or scan condition screen SC15 on the multi-function device 10, and receives the plurality of selected setting values from the multi-function device 10. Then, the mediation server 50 supplies the determination execution instruction including the plurality of selected setting values to the multi-function device 10, thereby enabling the multi-function device 10 to determine whether the plurality of selected setting values is valid (T60 of FIG. 4, T160 of FIG. 7). When the result information including the information indicating 'OK' is obtained, the mediation server 50 supplies the DP execution instruction or SU execution instruction to the multi-function device 10 (cases A2 and A3 of FIG. 5, cases B2 and B3 of FIG. 8), and when the result information including the information indicating 'NG' is obtained, the mediation server 50 displays the error screen SC6 or SC16 on the multi-function device 10 without supplying the DP execution instruction or SU execution instruction to the multi-function device 10 (case A1 of FIG. 5, case B1 of FIG. 8).

Incidentally, for example, a configuration (hereinafter, referred to as 'configuration of a comparative example') may be considered in which while the multi-function device 10 does not execute the determinations of T62 of FIG. 4 and T162 of FIG. 7, the mediation server 50 executes the determinations. However, according to the configuration of the comparative example, it is necessary to provide the mediation server 50 with not only a determination program for the multi-function device 10 having the model name 'M1' but also a determination program for a multi-function device having another model name. That is, it is necessary to provide the mediation server 50 with a plurality of determination programs corresponding to a plurality of types of models, so that a load for establishing the mediation server 50 is high.

In contrast, the mediation server 50 of this illustrative embodiment is configured to enable the multi-function device 10 to execute the determination. For this reason, since it is not necessary to provide the mediation server 50 with a plurality of determination programs, a load for establishing the mediation server 50 is reduced, as compared to the configuration of the comparative example.

(Correspondence Relation)

The multi-function device 10 is an example of an 'image processing apparatus' and an 'external apparatus'. The memory 34 in the multi-function device 10 is an example of a 'database'. The print condition screen information of S110 of FIG. 3 and the scan condition screen information of S210 of FIG. 6 are examples of 'specific information'. The print condition screen SC5 of FIG. 4 and the scan condition screen SC15 of FIG. 7 are examples of a 'condition setting screen'. The image processing for print and the image processing for scan are examples of 'target image processing'. Also, the DP execution instruction of S136 of FIG. 3 and the SU execution instruction of S236 of FIG. 6 are examples of a 'processing execution instruction'.

For example, in the print condition screen SC5 of FIG. 4, the item 'sheet' and the item 'duplex' are examples of a 'first setting item' and a 'second setting item', respectively. In this case, 'glossy sheet', 'one side', 'duplex' and 'normal sheet' are examples of a 'first setting value', a 'second setting value', a 'third setting value' and a 'fourth setting value', respectively. Also, the two candidate values (i.e., 'glossy sheet' and 'normal sheet') corresponding to the item 'sheet' and the two candidate values (i.e., 'duplex' and 'one side') corresponding to the item 'duplex' are examples of 'K1 values', 'K2 values', respectively. Also, for example, in the scan condition screen SC15 of FIG. 7, the item 'size' and the item 'scan method' are examples of a 'first setting item' and a 'second setting item', respectively. In this case, 'A3', 'ADF', 'FB' and 'A4' are examples of a 'first setting value', a 'second setting value', a 'third setting value' and a 'fourth setting value', respectively. Also, the four candidate values (i.e., 'A4', 'A3' and the like) corresponding to the item 'size' and the two candidate values (i.e., 'ADF' and 'FB') corresponding to the item 'scan method' are examples of 'K1 values' and 'K2 values', respectively.

Second Illustrative Embodiment

FIG. 9

In the first illustrative embodiment, the print condition screen SC5 or scan condition screen SC15 is displayed on the display unit 14 of the multi-function device 10. In the second illustrative embodiment, however, the print condition screen and the like are displayed on a user terminal 200. The user terminal 200 is a terminal apparatus such as a PC, a portable terminal (for example, a smart phone) and the like. Also, in this illustrative embodiment, it is not assumed that the target SP server is selected from the plurality of SP servers 100 by the user. Instead, it is assumed that only one SP server 100 capable of executing the image data supply function for supplying the image data obtained from the user terminal 200 to the mediation server 50 is used.

The multi-function device 10 has an ID '001', as the identification information for identifying the multi-function device 10. The user accesses the mediation server 50 by using the user terminal 200, for example, and associates and stores the ID '001' and the print capability information (refer to FIG. 1) of the multi-function device 10 in advance in the mediation server 50.

When the user wants to print the image data preserved in the user terminal 200 by the multi-function device 10, the user executes a printing operation on the user terminal 200, in T200. The printing operation includes an operation of activating a browser application installed in the user terminal 200 to access the SP server 100. Thereby, the user terminal 200 accesses the SP server 100 to receive a web page (not shown) from the SP server 100. The printing operation further includes an operation for designating the multi-function device 10 to execute the printing on the web page, i.e., an operation for selecting the ID '001' of the multi-function device 10. The printing operation further includes an operation for designating the image data preserved in the user terminal 200. In T202, the user terminal 200 supplies a request including the ID '001' of the multi-function device 10 to the SP server 100.

When the SP server 100 receives the request from the user terminal 200, the SP server 100 supplies the request including the ID '001' to the mediation server 50, in T204. Thereby, in T210, the mediation server 50 supplies a response including the print capability information (hereinafter, referred to as 'target print capability information') of the multi-function device 10 associated with the ID '001' to the SP server 100.

When the SP server 100 receives the response from the mediation server 50, the SP server 100 generates the print condition screen information and supplies the same to the user terminal 200, in T212. The method of generating the print condition screen information is substantially the same as S110 of FIG. 3. However, in this illustrative embodiment, the print condition screen information does not include the respective default setting values. However, in a modified embodiment, when the mediation server 50 receives the request of T204 from the SP server 100, the mediation server 50 may receive the default print condition information from the multi-function device 10 and supply a response including the default print condition information and target print capability information to the SP server 100, in T210. In this case, in T212, the SP server 100 may supply the print condition screen information including the respective default setting values to the user terminal 200.

In T220, the user terminal displays the print condition screen SC5 (refer to FIG. 4). In T222, the user selects the plurality of setting values on the print condition screen SC5. In T224, the user terminal supplies the plurality of selected setting values and the image data designated by the printing operation of T200 to the SP server 100.

When the SP server 100 receives the plurality of selected setting values and the image data from the user terminal 200, the SP server 100 stores the information in the memory of the SP server 100, and supplies the plurality of selected setting values to the mediation server 50, in T226. Thereby, in T230, the mediation server 50 supplies the determination execution instruction including the plurality of selected setting values to the multi-function device 10.

When the multi-function device 10 receives the determination execution instruction from the mediation server 50, the multi-function device 10 executes the determination in T232, and then supplies the result information to the mediation server 50 in T234. The processing of T232 and T234 is substantially the same as T62 and T64 of FIG. 4. However, in this illustrative embodiment, the multi-function device 10 does not include the operation requesting information in the result information. In T236, the mediation server 50 supplies the result information to the SP server 100.

When the result information obtained from the mediation server 50 includes the information indicating 'OK', the SP server 100 supplies the print execution instruction to the mediation server 50, in T240. The print execution instruction includes the plurality of selected setting values and the URL (i.e., the position information in the SP server 100) of the image data. In T242, the mediation server 50 supplies the print execution instruction including the plurality of selected setting values and the URL of the image data to the multi-function device 10.

In T244, the multi-function device 10 supplies a download request including the URL in the print execution instruction to the SP server 100 without via the mediation server 50. Thereby, in T246, the multi-function device 10 receives the image data from the SP server 100. Then, in T250, the multi-function device 10 executes the printing by using the plurality of selected setting values in the print execution instruction and the obtained image data. The processing of T250 is the same as T94 of FIG. 5.

On the other hand, when the result information obtained from the mediation server 50 includes the information indicating 'NG', the SP server 100 supplies the error screen information to the user terminal 200, in T260. Thereby, in T270, the user terminal 200 displays the error screen SC6 (refer to FIG. 5).

Also in this illustrative embodiment, the mediation server 50 enables the multi-function device 10 to execute the determination. For this reason, the load for establishing the mediation server 50 may be low. Meanwhile, in this illustrative embodiment, the SP server 100 is an example of an 'external apparatus'. The target print capability information of T210 is an example of 'specific information'. Also, the print execution instruction of T240 and the print execution instruction of T242 are examples of a 'specific instruction' and a 'processing execution instruction', respectively.

Figure 9:
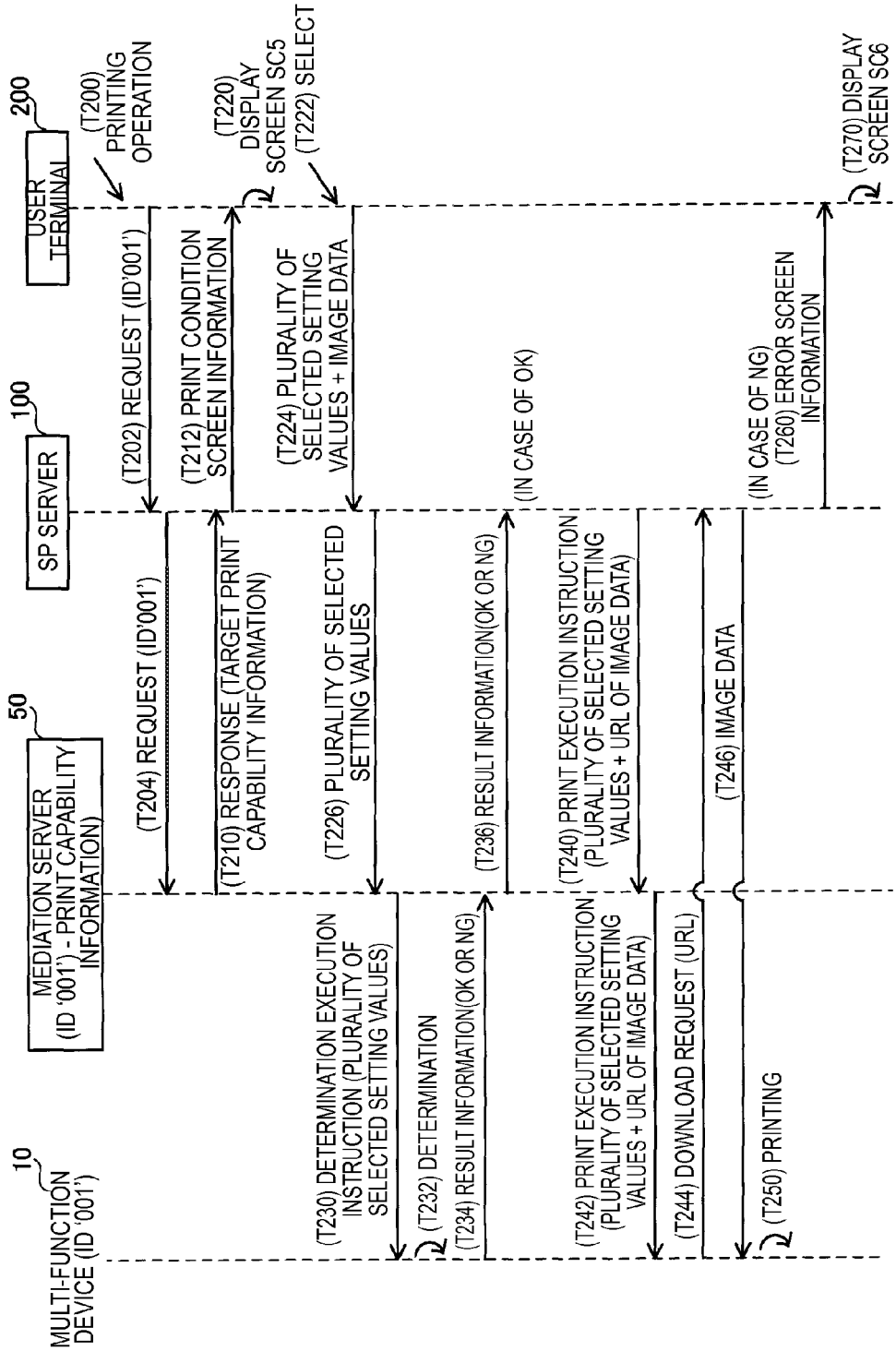
FIG. 9 shows a sequence diagram of respective processing that is executed by respective devices of a second illustrative embodiment.

Meanwhile, in FIG. 9, the image data preserved in the user terminal 200 is supplied to the multi-function device 10 through the SP server 100 and mediation server 50, and the printing is executed in the multi-function device 10. The technology of this illustrative embodiment can be also applied to a configuration where the image data, which is generated as the multi-function device 10 scans a document, is supplied to the user terminal 200 through the mediation server 50 and SP server 100. That is, the mediation server 50 is configured to associate and store the ID '001' of the multi-function device 10 and the scan capability information. The scan operation is executed in T200, the scan capability information is communicated in T210, the scan condition screen information is communicated in T212, and the scan condition screen SC15 (refer to FIG. 7) is displayed in T220. In T224, T226 and T242, the image data is not communicated. In T250, the scan is executed and the image data is thus generated. Then, the image data is supplied to the user terminal 200 through the mediation server 50 and SP server 100.

Modifications to Illustrative Embodiments

Although the illustrative embodiments of the present invention have been described in detail, the illustrative embodiments are just exemplary and do not limit the scope of the claims. The technology defined in the claims includes a variety of changes and modifications of the above-described illustrative embodiments, too. For example, following modified embodiments are included.

Modified Embodiment 1

In the first illustrative embodiment, the default print condition information is stored in the memory 34 of the multi-function device 10 (refer to T86 of FIG. 5). Instead of this configuration, the default print condition information may be stored in the memory 74 of the mediation server 50. In this case, the mediation server 50 can receive the default print condition information from the memory 74 without executing T40 and T42 of FIG. 4. Also, the default print condition information may be stored in a server different from the mediation server 50. In this case, the mediation server 50 may receive the default print condition information from the different server. That is, the 'database' may be provided in the image processing apparatus, the mediation server, or the device different from the image processing apparatus and the mediation server.

Modified Embodiment 2

In the first illustrative embodiment, when the mediation server 50 returns to S110 after S122 of FIG. 3, the mediation server 50 generates the print condition screen information so that the four default setting values are first displayed. Instead of this configuration, when the mediation server 50 returns to S110 after S122 of FIG. 3, the mediation server 50 may generate the print condition screen information so that the four selected setting values are first displayed. In this case, on the re-displayed print condition screen, the four selected setting values of which a combination is determined invalid are first displayed. Therefore, it is possible to easily notify the user of the setting values of which a combination is determined invalid, so that it is possible to prevent the respective setting values from being again selected by the user.

Modified Embodiment 3

The combination that is determined invalid is not limited to the combination of 'glossy sheet' and 'duplex' and the combination of 'A3' and 'FB'. For example, following combinations may be also determined invalid.

Modified Embodiment 3-1

For example, when there is a 'postcard' as the candidate value corresponding to the item 'size' relating to the print, it may be determined that a combination of 'postcard' and 'duplex' is not valid. This determination may be executed by the multi-function device having no mechanism for performing duplex printing for a printing medium having a postcard size. In this modified embodiment, the item 'size' and the item 'duplex' are examples of a 'first setting item' and a 'second setting item', respectively.

Modified Embodiment 3-2

For example, when there is an item 'duplex' indicating whether to execute a duplex scan or one-side scan and there is a 'postcard' as the candidate value corresponding to the item 'size', it may be determined that a combination of 'postcard' and 'duplex' is not valid. This determination may be executed by the multi-function device having no mechanism for performing duplex scan for a printing medium having a postcard size. In this modified embodiment, the item 'size' and the item 'duplex' are examples of a 'first setting item' and a 'second setting item', respectively. Generally speaking, the 'determination' may be a determination about validity of a combination of a plurality of setting values corresponding to a plurality of setting items relating to processing conditions of an image processing apparatus.

Modified Embodiment 4

The message displayed on the operation screens SC7, SC17 (refer to FIGS. 5 and 8) may be a following message. For example, when the multi-function device 10 has a dedicated tray on which a printing medium having a postcard size is placed and the selected setting value corresponding to the item 'size' relating to the printing indicates 'postcard', an operation screen including a message indicating that a postcard is requested to be set on the dedicated tray may be displayed. Also, for example, when the selected setting value corresponding to the item 'scan method' relating to the scan indicates 'FB', an operation screen including a message indicating that a document is requested to be set on the FB may be displayed. That is, a 'predetermined operation' may be any operation relating to target image processing.

Modified Embodiment 5

In the first illustrative embodiment, mediation server 50 is configured to store the print capability information for each model of the multi-function device. Instead of this configuration, the mediation server 50 may be configured to store the print capability information for each multi-function device. That is, the mediation server 50 may be configured to store the ID for identifying the multi-function device and the print capability information of the multi-function device for each of the plurality of multi-function devices. In this case, in S14 of FIG. 2, the multi-function device 10 may supply the initial request including the ID of the multi-function device 10 to the mediation server 50. Incidentally, the mediation server 50 may be configured to perform communication with each multi-function device to receive the print capability information from the multi-function device.

Modified Embodiment 6

When it is determined that the combination of the plurality of selected setting values is not valid, the multi-function device 10 may automatically determine a plurality of values of which combination is valid, and supply the result information indicating that the values are requested to be changed to the plurality of corresponding values to the mediation server 50. For example, when it is determined that a combination of 'glossy sheet' and 'duplex' is not valid, the multi-function device 10 may supply the result information, which indicates that the combination is requested to be changed to a combination of 'glossy sheet' and 'one side', to the mediation server 50. In this case, in S122 of FIG. 3, the mediation server 50 may supply the error screen information, which corresponds to the error screen including the message urging the user to change the combination to a combination of 'glossy sheet' and 'one side', to the multi-function device 10. This modified embodiment is also an example of the 'configuration where when the result information indicates that the combination is not valid, the processing execution instruction is not supplied to the image processing apparatus'. The error screen information is an example of 'error screen information'. Incidentally, when the user executes a print execution operation on the error screen, the mediation server 50 may supply the print execution instruction to the multi-function device 10. The corresponding print execution instruction may include a plurality of values of which a combination is valid and include the plurality of selected setting values, rather than the invalid combination. Also in the latter, the multi-function device 10 may execute the printing in accordance with the plurality of values of which a combination is valid. Incidentally, this modified embodiment can be also applied to the second illustrative embodiment in the same manner.

Modified Embodiment 7

In the respective illustrative embodiments, the CPU 72 of the mediation server 50 executes the processing in accordance with the software (i.e., program), thereby implementing the respective processing of FIGS. 2 to 9. Instead of this configuration, at least one of the respective processing may be implemented by hardware such as a logical circuit. Likewise, at least one of the respective processing executed by the multi-function device 10 may be implemented by hardware such as a logical circuit.

The technical elements described in the specification or drawings exhibit the technical usefulness individually or by a variety of combinations and are not limited to combinations defined in the claims at the time of the filing of the subject application. Further, the technologies described in the specification or drawings accomplish a plurality of purposes at the same time, and one accomplishment of the purposes also has the technical usefulness.

What is claimed is:

1. A mediation server for mediating target service provision from a service provision server to an image processing apparatus, the mediation server comprising:
a processor; and
memory storing instructions, the instructions, when executed by the processor, causing the mediation server to perform:
supplying specific information for displaying a condition setting screen to an external apparatus, the condition setting screen being a screen for setting a processing condition of target image processing, the target image processing relating to the target service and being to be executed by the image processing apparatus;
in response to a plurality of setting values corresponding to a plurality of setting items being selected on the condition setting screen, receiving the plurality of selected setting values from the external apparatus;
supplying a determination execution instruction to the image processing apparatus, the determination execution instruction comprising the plurality of selected setting values and being an instruction for enabling the image processing apparatus to execute a determination about validity of a combination of the plurality of selected setting values;
receiving result information indicating a result of the determination from the image processing apparatus;
in a case where the result information indicates that the combination is valid, supplying a processing execution instruction to the image processing apparatus, the processing execution instruction comprising the plurality of selected setting values and being an instruction for enabling the image processing apparatus to execute the target image processing in accordance with the processing condition determined by the plurality of selected setting values; and
in a case where the result information indicates that the combination is not valid, not to supply the processing execution instruction to the image processing apparatus,
wherein the determination comprises:
determining that the combination is valid in a case where the plurality of selected setting values comprises a first setting value corresponding to a first setting item of the plurality of setting items and a second setting value corresponding to a second setting item of the plurality of setting items;
determining that the combination is not valid in a case where the plurality of selected setting values comprises the first setting value and a third setting value corresponding to the second setting item and being different from the second setting value;
determining that the combination is valid in a case where the plurality of selected setting values comprises a fourth setting value corresponding to the first setting item and being different from the first setting value and the second setting value; and
determining that the combination is valid in a case where the plurality of selected setting values comprises the fourth setting value and the third setting value.

2. The mediation server according to claim 1,
wherein the memory further stores instructions, when executed by the processor, causing the mediation server to perform:
receiving a plurality of default setting values stored in a database;
wherein the instructions of supplying the specific information further cause the mediation server to perform supplying the specific information comprising the plurality of default setting values to the external apparatus so that the condition setting screen indicating the plurality of default setting values is first displayed; and
wherein the memory further stores instructions, when executed by the processor, causing the mediation server to perform:
in the case where the result information indicates that the combination is valid, storing the plurality of selected setting values in the database, as a plurality of new default setting values, instead of the plurality of default setting values.

3. The mediation server according to claim 1,
wherein the memory is configured to store K1 values corresponding to a first setting item of the plurality of setting items and K2 values corresponding to a second setting item of the plurality of setting items, each of the K1 values being a value that can be used as a setting value corresponding to the first setting item by the image processing apparatus, and each of the K2 values being a value that can be used as a setting value corresponding to the second setting item by the image processing apparatus, wherein K1 is an integer of two or larger and K2 is an integer of two or larger,
wherein the instructions of supplying the specific information further cause the mediation server to perform supplying the specific information comprising the K1 values and K2 values in the memory to the external apparatus,
wherein the condition setting screen is a screen for selecting one value, as a setting value corresponding to the first setting item, from the K1 values, and
wherein the condition setting screen is a screen for selecting one value, as a setting value corresponding to the second setting item, from the K2 values.

4. The mediation server according to claim 1,
wherein the target service comprises supplying image data stored in the service provision server to the image processing apparatus, and
wherein the target image processing is processing for printing an image expressed by the image data.

5. The mediation server according to claim 1,
wherein the target image processing is processing for scanning a document to generate image data, and
wherein the target service comprises receiving the image data from the image processing apparatus and preserving the image data in the service provision server.

6. The mediation server according to claim 1,
wherein the instructions of supplying the specific information further cause the mediation server to perform:
supplying the specific information for displaying the condition setting screen on a display unit of the image processing apparatus to the external apparatus that is the image processing apparatus, wherein the instructions of receiving the selected setting value further cause the mediation server to receive the plurality of selected setting values from the external apparatus that is the image processing apparatus, and wherein the memory further stores instructions, when executed by the processor, causing the mediation server to perform:

in the case where the result information indicates that the combination is not valid, supplying error screen information to the external apparatus that is the image processing apparatus, the error screen information being for displaying an error screen, which indicates the combination is not valid, on the display unit of the image processing apparatus.

7. The mediation server according to claim 6, wherein in the case where the result information indicates that the combination is not valid, the instructions of supplying the specific information further cause the mediation server to perform supplying again the specific information to the external apparatus that is the image processing apparatus so that the condition setting screen is displayed again on the display unit of the image processing apparatus after the error screen is displayed on the display unit of the image processing apparatus.

8. The mediation server according to claim 6, wherein the memory further stores instructions, when executed by the processor, causing the mediation server to perform:

in a case where the result information indicates that the combination is valid on a condition that the user executes a predetermined operation relating to the target image processing, supplying operation screen information to the external apparatus that is the image processing apparatus, the operation screen information being for displaying an operation screen, which indicates that the predetermined operation is requested to be executed, on the display unit of the image processing apparatus.

9. The mediation server according to claim 1, wherein the instructions of supplying the specific information further cause the mediation server to perform:

supplying the specific information to the external apparatus that is the service provision server, the specific information being for displaying the condition setting screen on a display unit of a user terminal, wherein the instructions of receiving the selected setting value further cause the mediation server to perform, in a case where the plurality of selected setting values is supplied to the service provision server from the user terminal, receiving the plurality of selected setting values from the external apparatus that is the service provision server, wherein the memory further stores instructions, when executed by the processor, causing the mediation server to perform supplying the result information to the service provision server, and wherein the instructions of supplying the processing execution instruction further cause the mediation server to perform:

in a case where a specific instruction is obtained from the service provision server, which is in response to the result information indicating that the combination is valid, supplying the processing execution instruction to the image processing apparatus; and in a case where the specific instruction is not obtained from the service provision server, which is in response to the result information indicating that the combination is not valid, not to supply the processing execution instruction to the image processing apparatus.

10. A non-transitory computer-readable medium having a computer program stored thereon and readable by a computer of a mediation server, the computer program, when executed by the computer, causes the mediation server to perform operations comprising:

a specific information supply process of supplying specific information for displaying a condition setting screen to an external apparatus, the condition setting screen being a screen for setting a processing condition of target image processing, the target image processing relating to target service and being to be executed by an image processing apparatus;

a selected setting value receiving process of, in response to a plurality of setting values corresponding to a plurality of setting items being selected on the condition setting screen by a user, receiving the plurality of selected setting values from the external apparatus;

a determination execution instruction supply process of supplying a determination execution instruction to the image processing apparatus, the determination execution instruction comprising the plurality of selected setting values and being an instruction for enabling the image processing apparatus to execute a determination about validity of a combination of the plurality of selected setting values;

a result information receiving process of receiving result information indicating a result of the determination from the image processing apparatus; and a processing execution instruction supply process comprising:

in a case where the result information indicates that the combination is valid, supplying a processing execution instruction to the image processing apparatus, the processing execution instruction comprising the plurality of selected setting values and being an instruction for enabling the image processing apparatus to execute the target image processing in accordance with the processing condition determined by the plurality of selected setting values; and in a case where the result information indicates that the combination is not valid, not to supply the processing execution instruction to the image processing apparatus, wherein the determination comprises:

determining that the combination is valid in a case where the plurality of selected setting values comprises a first setting value corresponding to a first setting item of the plurality of setting items and a second setting value corresponding to a second setting item of the plurality of setting items;

determining that the combination is not valid in a case where the plurality of selected setting values comprises the first setting value and a third setting value corresponding to the second setting item and being different from the second setting value;

determining that the combination is valid in a case where the plurality of selected setting values comprises a fourth setting value corresponding to the first setting item and being different from the first setting value and the second setting value; and determining that the combination is valid in a case where the plurality of selected setting values comprises the fourth setting value and the third setting value.

11. An image processing apparatus comprising:
a display unit; and
a control unit configured to:
- receive specific information for displaying a condition setting screen on the display unit from a mediation server, the mediation server being configured to mediation target service provision from a service provision server to the image processing apparatus, the condition setting screen being a screen for setting a processing condition of target image processing, the target image processing relating to the target service and being to be executed by the image processing apparatus;
- display the condition setting screen on the display unit by using the specific information;
- in response to a plurality of setting values corresponding to a plurality of setting items being selected on the condition setting screen, supply the plurality of selected setting values to the mediation server;
- receive a determination execution instruction from the mediation server, the determination execution instruction comprising the plurality of selected setting values;
- in response to receiving the determination execution instruction, determine whether it is possible to execute the target image processing in accordance with the processing condition determined by the plurality of selected setting values included in the determination execution instruction, the determination comprising a determination about validity of a combination of the plurality of selected setting values;
- supply result information indicating a result of the determination to the mediation server;
- in a case where the result information indicates that the combination is valid, receive a processing execution instruction from the mediation server, the processing execution instruction comprising the plurality of selected setting values;
- in a case where the result information indicates that the combination is not valid, not to receive the processing execution instruction from the mediation server; and
- in response to receiving the processing execution instruction, execute the target image processing in accordance with the processing condition determined by the plurality of selected setting values included in the determination execution instruction, wherein the determination comprises:
- determining that the combination is valid in a case where the plurality of selected setting values comprises a first setting value corresponding to a first setting item of the plurality of setting items and a second setting value corresponding to a second setting item of the plurality of setting items;
- determining that the combination is not valid in a case where the plurality of selected setting values comprises the first setting value and a third setting value corresponding to the second setting item and being different from the second setting value;
- determining that the combination is valid in a case where the plurality of selected setting values comprises a fourth setting value corresponding to the first setting item and being different from the first setting value and the second setting value; and
- determining that the combination is valid in a case where the plurality of selected setting values comprises the fourth setting value and the third setting value.

* * * * *